US 6,630,968 B1

(12) United States Patent
Tsuchihashi et al.

(10) Patent No.: US 6,630,968 B1
(45) Date of Patent: Oct. 7, 2003

(54) DISPLAY DEVICE, ELECTRONIC APPARATUS USING THE SAME, AND LIGHT GUIDER FOR DISPLAY DEVICES

(75) Inventors: Toshihiko Tsuchihashi, Matsumoto (JP); Chiyoaki Iijima, Ima (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/647,394

(22) PCT Filed: Jan. 25, 2000

(86) PCT No.: PCT/JP00/00367

§ 371 (c)(1),
(2), (4) Date: Sep. 25, 2000

(87) PCT Pub. No.: WO00/46633

PCT Pub. Date: Aug. 10, 2000

(30) Foreign Application Priority Data

Feb. 1, 1999  (JP) .......................................... 11-023719
Jun. 7, 1999  (JP) .......................................... 11-159899

(51) Int. Cl.⁷ ............................................ G02F 1/1335
(52) U.S. Cl. ............................ 349/65; 549/96; 549/113
(58) Field of Search ........................ 349/65, 96, 113, 349/119

(56) References Cited

U.S. PATENT DOCUMENTS

| | | | |
|---|---|---|---|
| 5,686,979 A | | 11/1997 | Weber et al. |
| 5,808,709 A | * | 9/1998 | Davis et al. .................. 349/65 |
| 6,008,871 A | * | 12/1999 | Okumura ..................... 349/61 |
| 6,124,905 A | * | 9/2000 | Iijama ......................... 349/62 |
| 6,147,934 A | * | 11/2000 | Arikawa et al. ............... 368/84 |
| 6,147,937 A | * | 11/2000 | Arikawa et al. ............. 368/242 |
| 6,185,161 B1 | * | 2/2001 | Arikawa et al. ............... 368/84 |
| 6,222,598 B1 | * | 4/2001 | Hiyama et al. ................ 349/65 |
| 6,246,455 B1 | * | 6/2001 | Iijima et al. .................. 349/65 |
| RE37,377 E | * | 9/2001 | Gunjima et al. ................ 349/9 |
| 6,504,589 B1 | * | 1/2003 | Kashima et al. ............... 349/96 |
| 6,559,911 B2 | * | 5/2003 | Arakawa et al. .............. 349/96 |

FOREIGN PATENT DOCUMENTS

| | | |
|---|---|---|
| JP | 405142412 A  * | 6/1993 |
| JP | 7-36025 | 2/1995 |
| JP | 07036025 | 2/1995 |
| JP | 09258203 | 10/1997 |
| JP | 10-96922 | 4/1998 |
| JP | 10096922 | 4/1998 |
| JP | 10253830 | 9/1998 |
| JP | 11064840 | 3/1999 |
| JP | 11064841 | 3/1999 |
| JP | 11072782 | 3/1999 |
| JP | 11167110 | 6/1999 |
| WO | WO 95/17692 | 6/1995 |

* cited by examiner

*Primary Examiner*—Toan Ton
*Assistant Examiner*—Hoan Nguyen
(74) *Attorney, Agent, or Firm*—Harness, Dickey & Pierce, P.L.C.

(57) ABSTRACT

A TN liquid crystal 140 is used as a liquid crystal panel, and a polarizer 130 is provided above the TN liquid crystal 140 while a polarizer 135, a light scattering layer 150 and a polarized light splitter 160 are provided in this order under the TN liquid crystal 140. Furthermore, under the polarized light splitter 160, there is provided a light guide 190 for introducing light of a light source 191 from under the polarized light splitter 160 and a reflecting plate 200. The polarized light splitter 160 is a reflecting polarizer which can accomplish the effective utilization of light so that extremely bright reflective and transmissive displays are obtainable. Additionally, since a light diffusing layer 150 is provided, even if the distance from the TN liquid crystal 140 to the reflecting plate 200 is prolonged, in the reflective display, no double image nor display bleeding occurs.

19 Claims, 15 Drawing Sheets

FIG. 5
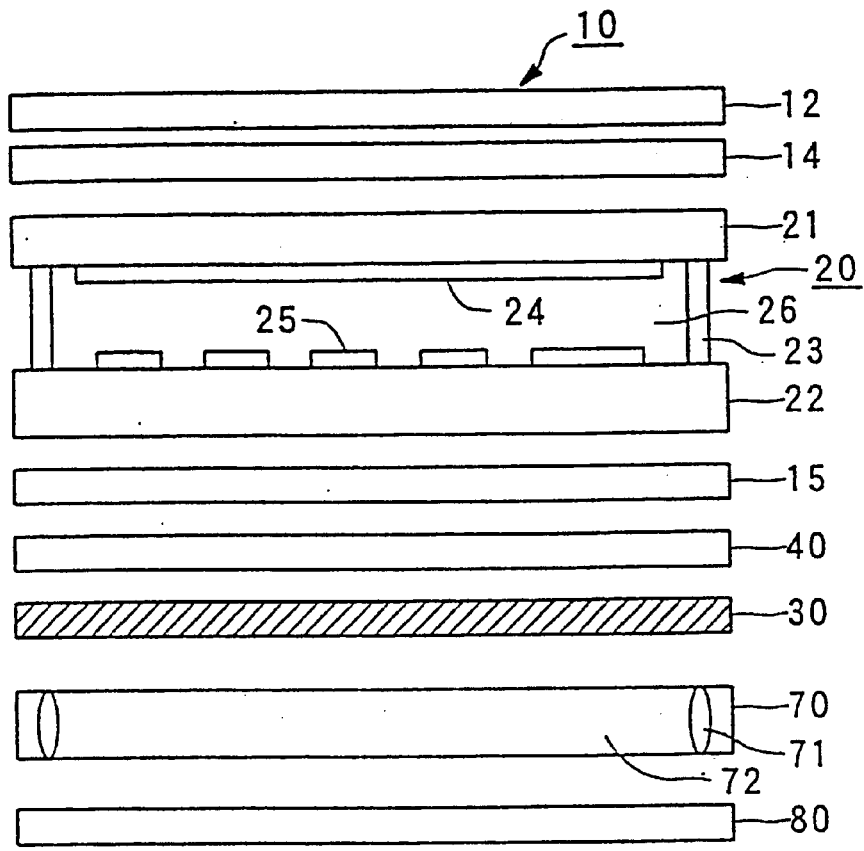
FIG. 6
(A) 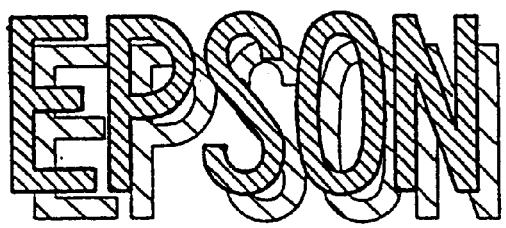   (B) 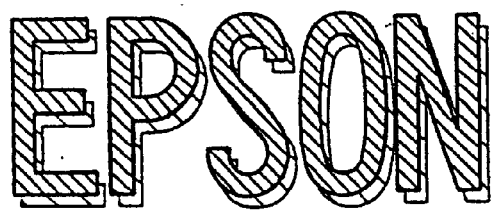

FIG. 14

| | COLOR FILTER A | | | COLOR FILTER B | | |
|---|---|---|---|---|---|---|
| | TRANSMITTANCE RATIO | CHROMATICITY | | TRANSMITTANCE RATIO | CHROMATICITY | |
| | Y | x | y | Y | x | y |
| AVERAGE | 58.1 | 0.315 | 0.329 | 67.7 | 0.309 | 0.319 |
| RED | 42.3 | 0.399 | 0.314 | 62.0 | 0.363 | 0.281 |
| GREEN | 71.9 | 0.317 | 0.380 | 80.2 | 0.313 | 0.395 |
| BLUE | 60.1 | 0.266 | 0.294 | 60.9 | 0.249 | 0.276 |

DISPLAY DEVICE, ELECTRONIC APPARATUS USING THE SAME, AND LIGHT GUIDER FOR DISPLAY DEVICES

TECHNICAL FIELD

The present invention relates to a technical field of a display device such as a liquid crystal device, and more particularly to a technical field of a transflective monochrome or color display device capable of displaying while switching between a reflective display and a transmissive display, an electronic apparatus using such a display device, and a light guide plate suitable for use in such a display device.

BACKGROUND ART

So far, reflective liquid crystal devices, because of its small power consumption, have come into widespread use as additional sections of portable units, apparatus and others, while there is a problem which arises with the reflective liquid crystal devices, however, in that, because a display is made visible through the use of the external light, the display is unreadable in the dark. For this reason, a transflective liquid crystal device, in which a display is made visible through the use of the external light in the light as in common reflective liquid crystal devices but through the use of an internal light source in the dark, has been proposed as exemplified by Japanese Unexamined Utility Model Publication No. 57-049271. Particularly, in connection with a transflective liquid crystal device utilizing a polarization axis variable means for rotating a polarization axis of a TN (Twisted Nematic) liquid crystal, a STN (Super-Twisted Nematic) liquid crystal or the like, this applicant has proposed a transflective display device using, as a means to better the brightness in the reflective display, a polarized light splitter which causes the reflection of a linearly polarized light component running in a predetermined direction while allowing the transmission of a linearly polarized light component advancing in a direction perpendicular thereto (Japanese Patent Application No. 8-245346). Referring to FIG. 22, a description will be made hereinbelow of a transflective display device using this polarized light splitter.

In FIG. 22, a TN liquid crystal panel is composed of an upper polarizer 5130, an upper glass substrate 5302, a lower glass substrate 5304, a polarized light splitter 5160, a semipermeable light absorbing layer 5307 and a light source 5210. In the illustration, a TN liquid crystal, placed between the upper glass substrate 5302 and the lower glass substrate 5304, is divided into a voltage non-applied area 5120 and a voltage applied area 5110.

First, a description will be given hereinbelow of achromatic display of a reflective display. Incident light from the exterior of the display device, indicated as an optical path 5601, turns through the upper polarizer 5130 to linearly polarized light in a direction parallel with the paper surface, and then form a linearly polarized light component in a direction perpendicular to the paper surface with its polarizing direction being twisted by 90° in the voltage non-applied section 5120 of the TN liquid crystal panel, and further is reflected on the polarized light splitter 5160 in a state of the same linearly polarized light in the direction perpendicular to the paper surface, and again undergoes a twist of 90° in its polarizing direction in the voltage non-applied section 5120 of the TN liquid crystal panel to develop into a linearly polarized light component in a direction parallel with the paper surface, finally going out of the upper polarizer 5130. Accordingly, no application of a voltage to the TN liquid crystal panel makes a white display. Thus, the white display light is light reflected on the polarized light splitter 5160, which produces a brighter display than a conventional transflective display device. The light indicated by an optical path 5603 forms linearly polarized light in a direction parallel with the paper surface due to the upper polarizer 5130, and advances with its polarizing direction remaining intact even in the voltage applied section 5110 of the TN liquid crystal panel and with it remaining the same linearly polarized light in the direction parallel with the paper surface, and further transmits with its polarizing direction being also kept intact even in the polarized light splitter 5160, thereafter being absorbed by the semipermeable light absorbing layer 5307 to produce a black display.

Secondly, a description will be given hereinbelow of achromatic display of a transmissive display. Light indicated by an optical path 5602 passes through an opening section made in the semipermeable light absorbing layer 5307 and turns to linearly polarized light in a direction parallel with the paper surface in the polarized light splitter 5160, and then undergoes a twist of 90° in its polarizing direction in the voltage non-applied section 5120 of the TN liquid crystal panel to form linearly polarized light perpendicular to the paper surface, thereafter absorbed in the upper polarizer 5130 to produce a black display. Light indicated by an optical path 5604 comes in through an opening section made in the semipermeable light absorbing layer 5307 turns through the polarized light splitter 5160 to form a linearly polarized light in a direction parallel with the paper surface and passes through the upper polarizer 5130 with its polarizing direction being kept intact even in the voltage applied section 5110 of the TN liquid crystal panel and with it remaining the same linearly polarized light parallel with the paper surface, thus providing a white display.

As described above, the transflective display device (Japanese Patent Application No. 8-245346) this applicant has proposed can accomplish more proper switching between a reflective display and a transmissive display in accordance with ON/OFF of a light source, which provides a relatively bright reflective display.

On the other hand, with the recent progress of portable equipment (portable telephones, PDAS, watches) or OA equipment, a request has existed for coloring in liquid crystal display, and even a requirement for coloring has occurred to equipment using such a transflective liquid crystal device. In general, a color filter is put to use for coloring of display on a liquid crystal device. However, the color filter absorbs light so that the display tends to be dark. Therefore, in order to enhance the utilization efficiency of light, there has sometimes been employed a mode (which will be referred to hereinafter as an "SPD") in which a polarizer is provided only on the visible side of the liquid crystal device and a reflecting layer is provided on an inner surface of a liquid crystal substrate. In the case of this SPD mode, only one polarizer can improve the utilization efficiency of light. Additionally, for realizing a transflective liquid crystal device with the SPD mode, a hole(s) is made in a portion of the reflecting layer or the reflecting layer is made relatively thin; whereupon, the reflecting layer has a permeable function to enable a transmissive display.

SUMMARY OF THE INVENTION

However, the use of the polarized light splitter shown in FIG. 22 causes a positive-negative reversal phenomenon due to a difference between incidence on the polarized light splitter from the upper side and incidence from the lower side. Thus, the mode of the positive-negative reversal between a transmissive display and a reflective display creates a problem in that it is unsuitable for the display device depending on the applications of the display device, or is impracticable. Additionally, because of the use of the semipermeable light absorbing layer, the utilization efficiency of light drops, particularly at the transmissive display, it becomes dark.

On the other hand, with the transflective liquid crystal disclosed in Japanese Unexamined Utility Model Publication No. 57-049271, since a thick transparent substrate of a liquid crystal panel is interposed between a liquid crystal layer and a transflective layer, double image or display bleeding occurs due to parallax, particularly for coloring, the color filter cannot exhibit sufficient color development.

Furthermore, the SPD mode requires lowering reflectance of a reflecting layer, which leads to a dark reflective display. Conversely, if the reflectance of the reflecting layer is increased in order to brighten the reflective display, then a dark transmission display occurs, which requires the enhancement of back light luminance. As described above, with the conventional transflective color display device, extreme difficulty is encountered in accomplishing a bright good-looking color display not only at the reflective display and but also at the transmissive display.

Accordingly, the present invention has been developed in consideration of the above-mentioned problems, and it is an object of the invention to provide, of transflective display devices using a polarization axis variable means, a transflective display device capable of preventing the positive-negative reversal between a reflective display relying on the external light and a transmissive display relying on lighting by a light source and further of achieving bright good-looking monochrome or color display, and further to provide an electronic apparatus using such a display device and a light guider suitable for use in such a display device.

The foregoing object of this invention is achievable by a display device comprising a liquid crystal panel in which a transmissive polarization axis is variable, first and second polarized light splitting plates located on both sides of the liquid crystal panel to interpose the liquid crystal panel therebetween, a reflecting layer located on the opposite side to the liquid crystal panel with respect to the second polarized light splitting plate, a light source, a light guider interposed between the second polarized light splitting plate and the reflecting layer for guiding light from the light source so that the light is incident through the second polarized light splitting plate on the liquid crystal panel and further for allowing transmission of light from the second polarized light splitting plate side and transmission of light from the reflecting layer side, and a front scatterplate interposed between the liquid crystal panel and the reflecting layer for scattering forwardly each of light from the reflecting layer side toward the liquid crystal panel side and light from the liquid crystal panel side toward the reflecting layer side.

With the first display device according to this invention, in the reflective display, the external light incident from the first polarized light splitting plate (for example, a polarizer or a reflecting polarizer) passes through the first polarized light splitting plate, the liquid crystal panel, the second polarized light splitting plate (for example, a polarizer or a reflecting polarizer), the front scatterplate and the light guider, and is then reflected on the reflecting plate to be outputted from the first polarized light splitting plate. At this time, the light (for example, a linearly polarized light) polarized through the first polarized light splitting plate, the liquid crystal panel and the second polarized light splitting plate is scattered forwardly when passing through the front scatterplate to form white scattering light which in turn, is reflected on the reflecting layer. This reflected light is further scattered forwardly through the front scatterplate and, as white scattering light, passes through the second polarized light splitting plate, the liquid crystal panel and the first polarized light splitting plate to be outputted as the re-polarized light from the first polarized light splitting plate side. In this way, since the polarized state of the external light (reflected light) reflected on the reflecting layer and further scattered forwardly by the front scatterplate varies through the second polarized light splitting plate, the liquid crystal panel and the first polarized light splitting plate so that the reflective display takes place, when viewed from the first polarized light splitting plate side, the scattering plane of the front scatterplate on which the reflected light is scattered forwardly look as if it is at the reflecting position. Accordingly, even if the distance from the liquid crystal panel to the reflecting layer is prolonged, neither double image nor bleeding in display occurs due to parallax. In this invention, the term "forward scattering" signifies that the quantity of light scattered forwardly is larger than the quantity of light scattered rearwardly with respect to the advancing direction of incident light.

On the other hand, in the transmissive display, the light source light emitted from the light source and guided by the light guider varies in its polarized state through the second polarized light splitting plate, the liquid crystal panel and the first polarized light splitting plate, thereby carrying out the display. This enables a bright display through the use of the light source light in a dark place.

In a mode of the first display device according to this invention, the front scatterplate is put between the liquid crystal panel and the light guider.

According to this mode, in the transmissive display, the light source light emitted from the light source and guided by the light guider is scattered forwardly by the front scatterplate and is incident on the second polarized light splitting plate as white scattering light so that a display is made in a state where its polarized state varies through the second polarized light splitting plate, the liquid crystal panel and the first polarized light splitting plate. Particularly, as compared with the case in which the light guider is interposed between the front scatterplate and the liquid crystal panel, the distance between the front scatterplate and the liquid crystal panel is shorter; whereupon, the scattering plane of the front scatterplate which looks like the reflecting position in the reflective display in connection with that shortness approaches the liquid crystal panel. In consequence, the double image or display bleeding due to the parallax caused by the distance between the front scatterplate and the liquid crystal panel is reducible. Additionally, since the reflected light of the external light is developed into white scattering light in the front scatterplate, shadow on the reflecting layer occurring due to the parallax stemming from the light guider reduces in a dark section displayed by being absorbed in the second polarized light splitting plate.

In another mode of the first display device according to this invention, the optical anisotropy in the light guider is so low that it hardly has influence on display chrominance non-uniformity in the display device.

According to this mode, since the light guider is optically close to the isotropy, the corresponding optical anisotropy is high so that colored appearance of display or occurrence of chrominance non-uniformity is avoidable. Additionally, for prevention of such chrominance non-uniformity, if the optical scattering of the reflecting layer or the front scatterplate is made to step up, then the occurrence of a dark display is also avoidable.

In a further mode of the first display device according to this invention, in the light guider, the optical axis direction is constant.

According to this mode, contrary to the aforesaid mode in which the optical anisotropy of the light guider is low, the light guider has an optical anisotropy and the optical axis direction is constant, that is, it has a rule such as uniaxial or biaxial, which can eliminate the chrominance non-uniformity and enhance the contrast while enlarging the angle of field in display.

In a further mode of the first display device according to this invention, a third polarized light splitting plate is additionally provided between the second polarized light splitting plate and the light guider. In this case, the aforesaid first polarized light splitting plate acts as a polarized light splitting plate which transmits, absorbs or reflects incident light in accordance with its polarized light component, while the aforesaid second polarized light splitting plate serves as a polarized light splitting plate which transmits, absorbs or reflects incident light in accordance with its polarized light component, and even the aforesaid third polarized light splitting plate functions as a polarized light splitting plate which transmits or reflects incident light in accordance with its polarized light component, with the direction of the polarization axis of the second polarized light splitting plate coinciding approximately with the direction of the polarization axis of the third polarized light splitting plate.

According to this mode, each of the first and second polarized light splitting plates are made, for example, from a polarizer. Additionally, the third polarized light splitting plate, for example composed of a reflecting polarizer, accepts the transmission of a linearly polarized light component of the incident light from the second polarized light splitting plate, assuming a direction coinciding approximately with the direction of the polarization axis of the second polarized light splitting plate, to the light guider side to output a portion of the incident light from the light guider to the second polarized light splitting plate side while reflecting the remaining portion thereof to the light guider side, thereby accomplishing polarization separation. Thus, it is possible to effectively use almost all light existing between the light guider and the reflecting layer, so bright image is achievable not only in the reflective display but also in the transmissive display. In this case, the "the direction of the transmission axes coincide approximately" signifies that the angle made between the direction of these transmission axes is in the range of 0° to 40°, preferably in the range of 0° to 15°. Particularly, as the angle made between these polarization axis directions increases, the transmissive display becomes darker.

In this mode, it is also possible that the third polarized light splitting plate is a polarized light splitting plate which reflects, of the incident light, a linearly polarized light component in a direction substantially perpendicular to the direction of the polarization axis of the third polarized light splitting plate.

In this construction, owing to the polarization separation in the third polarized light splitting plate made from a reflecting polarizer, it is possible to effectively use almost all light existing between the light guider and the reflecting layer, so extremely bright reflective and transmissive displays are attainable.

In this case, it is also appropriate that the third polarized light splitting plate is a laminated member produced by piling up a plurality of layers closely, and the refractive indexes of the plurality of layers are equal to each other between adjacent layers in one predetermined direction while being different from each other in another direction perpendicular to that one predetermined direction.

With this construction, in the third polarized light splitting plate composed of a reflecting polarizer, of light incident on one main surface of the third polarized light splitting plate from the piling-up, a linearly polarized light component in one predetermined direction reaches the other main surface on the opposite side in the state of the linearly polarized light component in that one predetermined direction, while a linearly polarized light component in another predetermined direction perpendicular to that one predetermined direction is reflected thereon as the linearly polarized light component. Furthermore, of light incident on the other main surface of the third polarized light splitting plate from the piling-up direction, a linearly polarized light component in that one predetermined direction arrives at the opposite side of one main surface side in a state of the linearly polarized light component in that one predetermined direction, while a linearly polarized light component in another predetermined direction perpendicular to that one predetermined direction is reflected thereon as the linearly polarized light component.

In a further mode of the first display device according to this invention, the liquid crystal panel is composed of a TN liquid crystal element, an STN liquid crystal element or an ECB (Electrically Controlled Birefringence) liquid crystal element.

According to this mode, it is possible to realize a high-quality liquid crystal display device offering bright reflective and transmissive displays without causing the positive-negative reversal in both displays. Incidentally, this STN liquid crystal element includes an STN liquid crystal element using a color compensation optical anisotropic material. Additionally, if used is a liquid crystal element, such as an ECB liquid crystal element, having a birefringence effect, it is possible to vary the color development from the light source.

The above-mentioned object of this invention is achievable by a second display device according to this invention comprising a liquid crystal panel in which a polarization axis is variable, first and second polarized light splitting plates located on both sides of the liquid crystal panel to interpose the liquid crystal panel therebetween, a reflecting layer located on the opposite side to the liquid crystal panel with respect to the second polarized light splitting plate, a light source, and a light guider located between the second polarized light splitting plate and the reflecting layer for guiding light from the light source through the second polarized light splitting plate to the liquid crystal panel and further for allowing transmission of light from the second polarized light splitting plate side and light from the reflecting layer side, with the light guider having an optical anisotropy which is so low that it hardly has influence on display chrominance non-uniformity or with the light guider having a constant optical axis direction.

With the second display device according to this invention, as mentioned above, the light guider has an optical anisotropy so low as to exert little influence on display chrominance non-uniformity or has a constant optical axis direction, and particularly in the reflective display, there is no need to step up light scattering through the use of, for example, a front scatterplate for the purpose of obscuring the display chrominance non-uniformity stemming from the optical anisotropy, and a bright good-looking display is attainable.

In a mode of the second display device according to this invention, there is additionally provided a front scatterplate located between the liquid crystal panel and the reflecting layer for forwardly scattering each of light from the reflecting layer side toward the liquid crystal panel side and light from the liquid crystal panel side toward the reflecting layer side.

According to this mode, as in the case of the above-described first display device according to this invention, in the reflective display, even if the distance from the liquid crystal panel to the reflecting layer is prolonged, neither double image nor bleeding in display stemming from the resultant parallax occurs, and the reflected light turns white. On the other hand, in the transmissive display, a bright display is obtainable through the use of light source light.

In another mode of the second display device according to this invention, the first polarized light splitting plate is a polarized light splitting plate which transmits, absorbs or reflects incident light in accordance with its polarized light component, while the second polarized light splitting plate is a polarized light splitting plate which transmits, absorbs or reflects incident light in accordance with its polarized light component.

According to this mode, it is possible to offer a bright display while conducting polarized light separation through the use of the first and second polarized light splitting plates each constructed with, for example, a polarizer.

In a further mode of the second display device according to this invention, the liquid crystal panel is composed of a TN liquid crystal element, an STN liquid crystal element or an ECB liquid crystal element.

According to this mode, it is possible to realize a high-quality liquid crystal display device providing bright reflective and transmissive displays without causing positive-negative reversal in both the displays.

In a further mode of the first display device according to this invention, additionally provided is coloring means interposed between the first polarized light splitting plate and the light guider.

According to this mode, not only in the reflective display relying on the external light but also in the transmissive display relying on light source lighting, the external light or the light source light passes through the coloring means, thereby accomplishing a color display. Particularly in the reflective display, the external light changed in polarized state by passing through the first polarized light splitting plate, the liquid crystal panel and the second polarized light splitting plate and colored by the coloring means is once returned to white scattering light by means of the front scatterplate, and then is reflected on the reflecting layer to penetrate the first polarized light splitting plate, the liquid crystal panel and the second polarized light splitting plate through the reflecting layer so that a change of its polarized state takes place, and again colored by the coloring means, thereafter being outputted from the first polarizing means side. Accordingly, even if the external light component passes through different coloring areas before and after the reflection, since the external light colored before the reflection is once returned to white scattering light, finally the color bleeding due to the external light (reflected light) colored after the reflection disappears substantially on the display image, thus achieving a bright good-looking color display.

In this mode, it is also acceptable that the coloring means is constructed with a color filter.

With this construction, the external light or the light source light is colored by the color filter so that a color display takes place in the reflective display and in the transmissive display. Among the coloring means, there are a light selection reflecting layer using a light interference filter, a hologram, a cholesteric liquid crystal or the like, a phase contrast layer, and others. However, from an easy-manufacturing point of view, a color filter using a dye or a pigment is most preferable.

In addition, with this construction, it is also possible that the aforesaid color filter is composed of three colors: a red-based color, a green-based color and a blue-based color.

According to this mode, a multicolor display and further a full-color display becomes possible.

Still additionally, in this case, the three-color filter can also be made so that its average transmittance ratio is in a range of 30% to 80%.

According to this mode, the average transmittance radio $Ym$ of the three-color filter is expressed as:

$$Ym=(YR+YG+YB)/3 \qquad (1)$$

where YR, YG and YB represent the transmittance ratios of the red-based color, the green-based color and the blue-based color, respectively.

Thus, when this average transmittance ratio $Ym$ is set in the range of 30% to 80%, it is possible to provide a bright color display in the reflective display and to offer a non-fade-out color display in the transmissive display.

In a further mode of the second display device according to this invention, coloring means is provided additionally in a state interposed between the first polarized light splitting plate and the light guider.

According to this mode, not only in the reflective display relying on the external light but also in the transmissive display relying on the light source lighting, the external light or the light source light passes through the coloring means to produce a color display. Particularly, in the light guider, since the optical anisotropy is so low as to exert little influence on display chrominance non-uniformity or the optical axis direction is constant, a bright good-looking color display is attainable.

The above-mentioned object of this invention is also achievable by a first electronic apparatus incorporating the above-described first display device (including the above-described various modes) according to this invention.

According to the first electronic apparatus, because it is equipped with the above-described first display device according to this invention, in the reflective display, double image or bleeding is reducible, thereby enabling a bright good-looking monochrome or color display. In the transmissive display, a bright monochrome or color display is feasible.

The above-mentioned object of this invention is also achievable by a second electronic apparatus incorporating the above-described second display device (including the above-described various modes) according to this invention.

According to the second electronic apparatus, because it is equipped with the above-described second display device according to this invention, particularly in the reflective display, there is no need to increase the light scattering, for example, through the use of a front scatterplate for the purpose of obscuring the display chrominance non-uniformity stemming from the optical anisotropy, and a bright good-looking monochrome or color display is feasible.

The above-mentioned object of this invention is also achievable by a light guider for a first display device in which the optical anisotropy is so low in a plane as to exert little influence on display chrominance non-uniformity when used for a display device.

Alternatively, the above-mentioned object of this invention is also achievable by a light guider for a second display device, whose optical axis direction is a constant direction.

That is, when the light guide according to this invention for the first or second display device is used as the light guider in the above-described first or second display device according to this invention, as stated above, particularly in the reflective display, there is no need to step up the light scattering, for example, through the use of a front scatterplate for obscuring the display chrominance non-uniformity caused by the optical anisotropy, and a bright good-looking display is obtainable.

In this connection, in such a conventional art as shown in FIG. 22, since the reflecting plate is closer to the liquid crystal panel than the light guider, the optical anisotropy in the light guide basically exerts no influence on the display chrominance non-uniformity. For this reason, in the case of the conventional light guider, for the production thereof, no consideration has been given to the magnitude of its optical anisotropy or its optical axis direction. In consequence, in the conventional light guider, the optical anisotropy is so high as to exert influence on the display chrominance non-uniformity or the optical axis direction is not arranged in a constant direction. Accordingly, if the conventional light guider is built in such a construction as this invention in which a reflecting plate is on the remote side from a liquid crystal panel than a light guider, it is impracticable because display chrominance non-uniformity occurs.

Incidentally, when the above-described display devices according to this invention are constructed as a display device based on all well-known addressing systems such as a passive matrix system, an active-matrix system using TFTs (Thin Film Transistors) or TFDs (Thin Film Diodes) and a segment system, bright reflective and transmissive displays are also realizable.

Furthermore, in addition to the above-mentioned reflecting polarizer, the third polarized light splitting plate in the display device according to this invention accepts, for example, a combination of a cholesteric liquid crystal layer and a (¼) λ plate, an element designed to perform separation into reflected polarized light and transmitting polarized light utilizing an angle of polarization (SID 92 DIGEST p427–429), an element using a hologram, a device disclosed in International Application published (International Application Publication: WO95/27819 and WO95/17692), and others. Incidentally, these various types of polarized light splitters are similarly available in place of the reflecting polarizer for each of embodiments which will be described later. Moreover, as each of the first and second polarized light splitting plates in the display devices according to this invention, in addition to the above-mentioned polarizer, it is also possible to employ various types of polarized light splitting plates.

The operations and other advantages of this invention will become apparent from the following description of embodiments.

BRIEF DESCRIPTION OF THE DRAWINGS

FIG. 5 is an exploded cross-sectional view for explaining a display device according to the second embodiment of this invention.

FIG. 6 is an illustration of displays in the first and second embodiments of this invention.

FIG. 14 is a table showing transmittance ratios and chromaticities of red, green and blue colors of the color filter for use in the display device according to ninth embodiment of this invention.

DETAILED DESCRIPTION OF THE INVENTION

Figure 1:
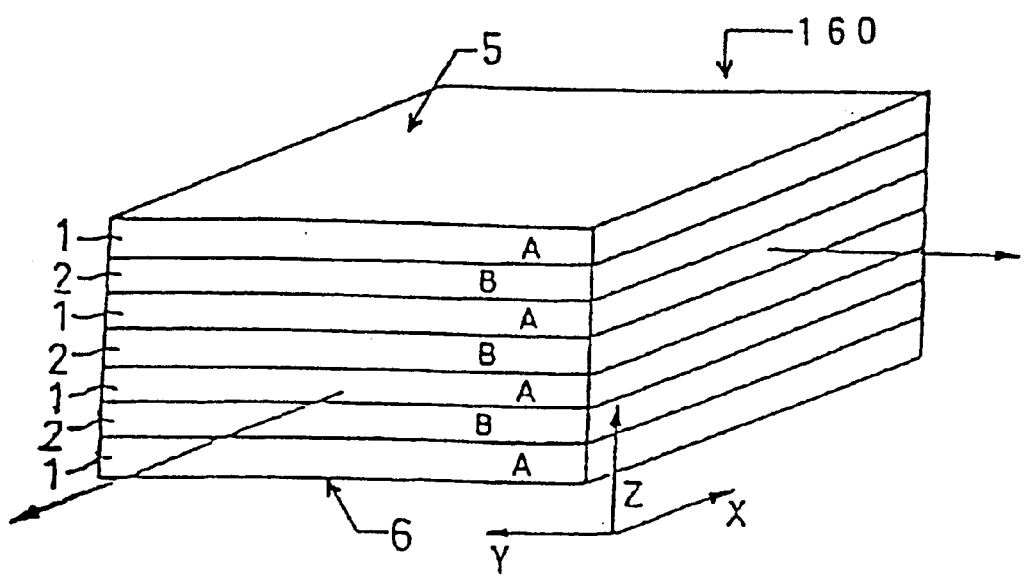
FIG. 1 is a perspective view schematically showing a polarized light splitter for use in a display device according to each of embodiments of the present invention.

Referring to the drawings, in each of embodiments, a description will be given hereinbelow of the best modes of the present invention.

Figure 2:
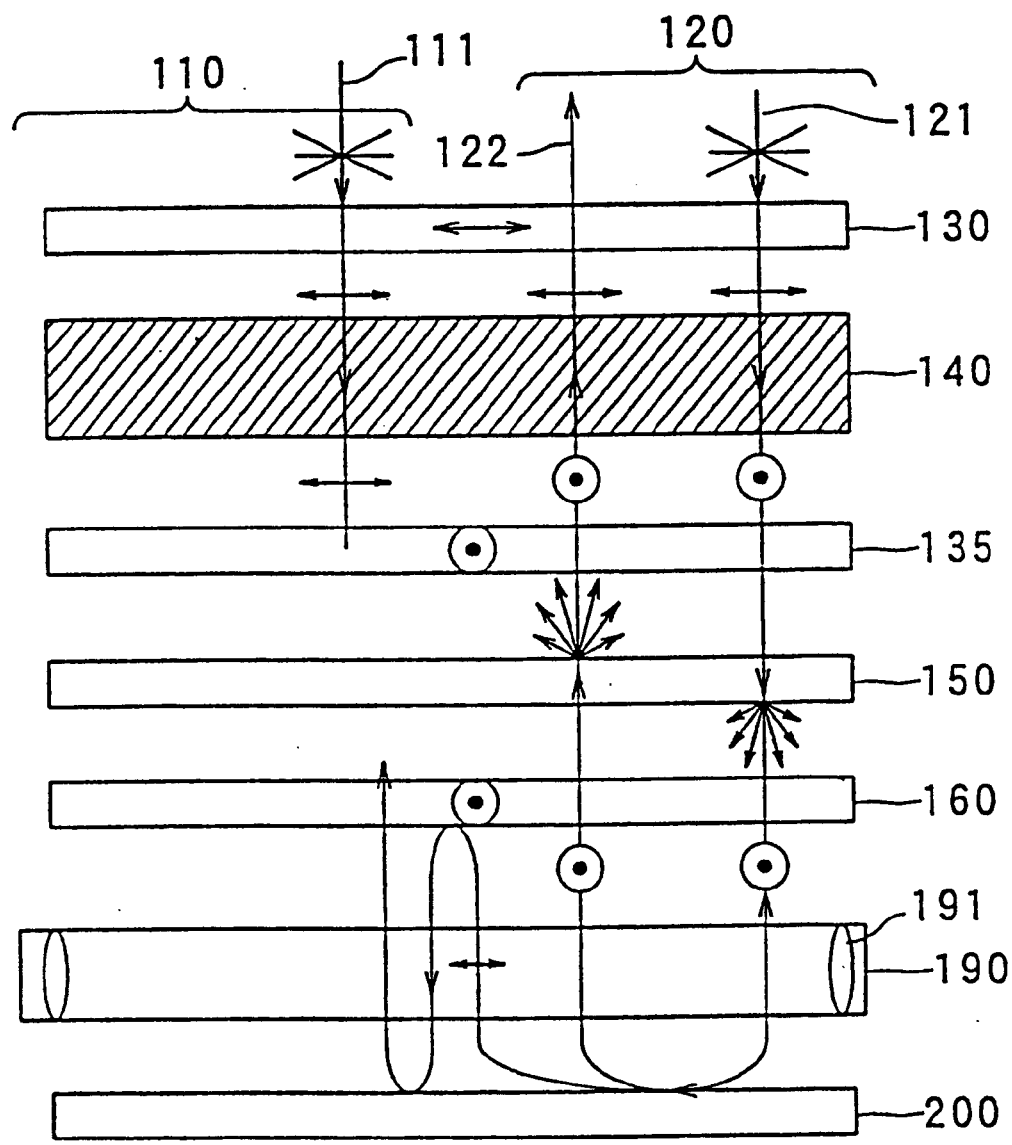
FIG. 2 is an illustration for explaining the principle of a reflective display in monochrome display devices according to first to sixth embodiments of this invention.
Figure 3:
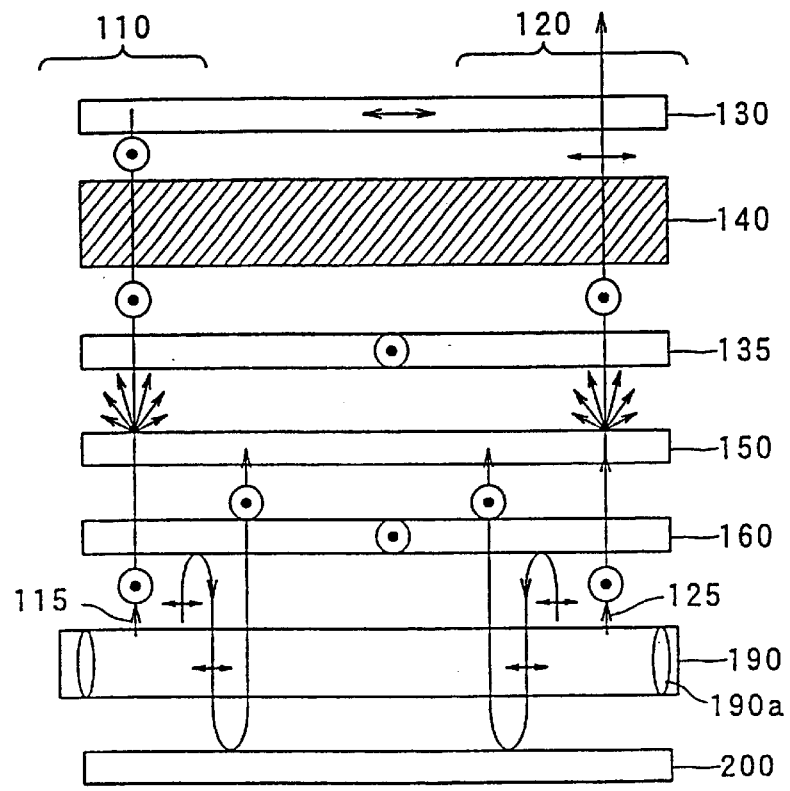
FIG. 3 is an illustration for explaining the principle of a transmissive display in monochrome display devices according to first to sixth embodiments of this invention.

First of all, referring to FIGS. 1, 2 and 3, the description will begin at the operational principle of monochrome display devices according to first to sixth embodiments of this invention to be explained later. FIG. 1 is a perspective view schematically showing a polarized light splitter for use in each of embodiment of this invention, FIG. 2 is an illustration for describing a case in which the external light is incident on a monochrome display device using this polarized light splitter, and FIG. 3 is an illustration for describing a case in which a light source goes on in this monochrome display device.

In FIG. 1, a polarized light splitter 160 has a construction in which two different layers, an A layer 1 and a B layer 2, are piled up alternately on each other to produce a piled-up structure of a plurality of layers. The refractive index (nAX) of the A layer 1 in the X direction and the refractive index (nAY) thereof in the Y direction differ from each other. The refractive index (nBX) of the B layer 2 in the X direction and the refractive index (nBY) thereof in the Y direction are equal to each other. Furthermore, the refractive index (nAY) of the A layer 1 in the Y direction and the refractive index (nBY) of the B layer in the Y direction are equal to each other.

Thus, of the light incident on the polarized light splitter 160 from a direction perpendicular to the upper surface 5 of the polarized light splitter 160, the linearly polarized light in the Y direction penetrates through the polarized light splitter 160 and is outputted from the lower surface 6 as the linearly polarized light in the Y direction. On the other hand, of the light incident on the polarized light splitter 160 from a direction perpendicular to the lower surface 6 of the polarized light splitter 160, the linearly polarized light in the Y direction penetrates the polarized light splitter 160 and emerges from the upper surface 5 as the linearly polarized light in the Y direction. The Y direction forming the penetrating direction will be referred to herein as a polarization axis.

When the thickness of the A layer 1 in the Z direction is taken as tA, the thickness of the B layer 2 in the Z direction is taken as tB and the wavelength of the incident light is taken as $\lambda$, if $$tA \cdot nAX + tB \cdot nBX = \lambda/2, \quad (2)$$

then, of the light incident on the polarized light splitter 160 in the direction perpendicular to the upper surface 5 of the polarized light splitter 160, the linearly polarized light in the X direction is reflected by this polarized light splitter 160 as the linearly polarized light in the X direction. Additionally, the linearly polarized light having the wavelength $\lambda$ and incident on the lower surface 6 of the polarized light splitter 160 is reflected by this polarized light splitter 160 as the linearly polarized light in the X direction. The X direction forming the reflection direction will be referred to herein as a reflection axis. Furthermore, when the thickness tA of the A layer 1 in the Z direction and the thickness tB of the B layer 2 in the Z direction are changed variously to satisfy the foregoing equation (2) throughout the overall wavelength range of the visible light, a polarized light splitter is obtainable which, in addition to the monochrome, throughout all the white light, reflects the linearly polarized light in the X direction as the linearly polarized light in the X direction and transmits the linearly polarized light in the Y direction as the linearly polarized light in the Y direction.

Such a polarized light splitter has been disclosed as a reflecting polarizer in the International Publication (WO95/17692).

FIG. 2 is an illustration for explaining a case in which the external light is incident on a display device using the polarized light splitter 160 (that is, a reflective display).

In FIG. 2, this display device employs a TN liquid crystal 140 as polarization axis variable means. Above the TN liquid crystal 140, a polarizer 130 is provided as one example of first polarized light splitting means. Under the TN element 140, in order, a polarizer 135 is located as one example of second polarized light splitting means, a light scattering layer 150 is located as one example of a light diffusion means, and a polarized light splitter 160 is located as one example of third polarized light splitting means. Additionally, under the polarized light splitter 160, a light guide 190 is placed as one example of a light guider for guiding light source light emitted from a light source 191 such as an LED so that it is incident on the polarized light splitter 160 from the under, and a reflecting plate 200 is situated under the light guide 190.

First, referring to FIG. 2, a description will be made as the left side of this display device under the external light is a voltage applied section 110 while the right side thereof is a voltage non-applied section 120.

In the voltage non-applied section 120 on the right side, the natural light 121 turns through the polarizer 130 to linearly polarized light parallel with the paper surface, and then forms linearly polarized light in a direction perpendicular to the paper surface with its polarizing direction being twisted 90° by the TN liquid crystal 140, thereafter passing through the polarizer 135 as linearly polarized light in a direction perpendicular to the paper surface. This linearly polarized light is developed into white scattering light by means of the light scattering layer 150, and subsequently is evolved into linearly polarized light perpendicular to the paper surface by means of the polarized light splitter 160, thereafter penetrating through the same polarized light splitter 160. Subsequently, the linearly polarized light passes through the transparent light guide 190 and, after being reflected on the reflecting plate 200, again passes through the light guide 190 and the polarized light splitter 160 as linearly polarized light in a direction perpendicular to the paper surface. This linearly polarized light is again evolved into white scattering light by the light scattering layer 150 and developed into linearly polarized light in a direction perpendicular to the paper surface by the polarizer 135, before passing through this polarizer 135. Furthermore, it undergoes a twist of its polarizing direction by 90° in the TN liquid crystal 140 to produce linearly polarized light in a direction parallel with the paper surface, then emerging from the polarizer 130 as linearly polarized light 122 in a direction parallel with the paper surface.

Particularly, in this invention, since the light scattering layer 150 is provided between the polarizer 135 and the polarized light splitter 160, when the light 122 is viewed from the polarizer 130 side, it looks as if the scattering plane of the light diffusion layer 150 in which the reflected light is scattered forwardly is at the reflecting position. That is, because of the forward scattering in the light diffusion layer 150, little or no image nor shadow appears at the more rear side than the light diffusion layer 150. Accordingly, in the device structure, even if the distance from the TN liquid crystal 140 to the reflecting plate 200 is prolonged, no double image nor bleeding in display occurs due to the parallax resulting therefrom.

Incidentally, such a light scattering layer 150 is also producible, for example, by mixing, into a polymeric resin, particulate of a resin different in refractive index from the polymeric resin. Additionally, this light scattering layer 150 can be formed to have a forward scattering characteristic, for example, at a haze value of approximately 15 to 95%, while the degree of the forward scattering characteristic depends experientially, experimentally and theoretically upon the device specification or the required image quality.

The light reflected on the reflecting plate 200 includes, in addition to linearly polarized light in a direction perpendicular to the paper surface, linearly polarized light in a direction parallel with the paper surface. This linearly polarized light parallel with the paper surface is reflected on the polarized light splitter 160 and is again reflected by the reflecting plate 200 so that its polarizing direction varies, which partially forms linearly polarized light in a direction perpendicular to the paper surface. This linearly polarized light passes through the polarized light splitter 160. The repetition of this operation enables effective utilization of light for brightness. In this way, at the voltage non-application, the light incident thereon can effectively be used owing to the polarized light splitter 160 to produce a bright display.

In the voltage applied section 110 on the left side, the natural light 111 turns to linearly polarized light in a direction parallel with the paper surface by means of the polarizer 130, and subsequently passes through the TN liquid crystal 140 without changing its polarizing direction and is absorbed by the polarizer 135, thereby producing a dark state.

As described above, in the case of the reflective display, in the voltage non-applied section 120, the light reflected on the reflecting plate 200 is scattered forwardly by the light scattering layer 150 to be once developed into white scattering light, so it is possible to reduce the double image and bleeding in display and further to effectively utilize the light by the polarized light splitter 160, thereby offering a bright display. On the other hand, in the voltage applied section 110, the light is absorbed by the polarizer 135 to produce a dark display so that high contrast is attainable.

Furthermore, referring to FIG. 3, a description will be given of a case in which the light source 191 goes on (that is, the transmissive display). The device shown in FIG. 3 is identical to that shown in FIG. 2.

In the voltage non-applied section 120 on the right side, of the light source light 125, the linearly polarized light in a direction perpendicular to the paper surface passes through the polarized light splitter 160. Additionally, of the light source light 125, the linearly polarized light in a direction parallel with the paper surface is reflected on the polarized light splitter 160 and is again reflected on the reflecting plate 200 so that its polarizing direction varies, so that a portion thereof forms linearly polarized light in a direction perpendicular to the paper surface and passes through the polarized light splitter 160. When this operation is repeated, almost all the light passes through the polarized light splitter 160. The linearly polarized light passing through the polarized light splitter 160 and running in the direction perpendicular to the paper surface is evolved into white scattering light by the light scattering layer 150 and then developed by the polarizer 135 into linearly polarized light in a direction perpendicular to the paper surface to pass through the polarizer 135. This light undergoes a twist of its polarizing direction by 90° in the TN liquid crystal 140 to form linearly polarized light in a direction parallel with the paper surface, then passing through the polarizer 130. That is, it is possible to effectively use almost all the light, thus offering extreme brightness.

In the voltage applied section 110 on the left side, as well as the voltage non applied section 120, the light source light 115 reaches the TN liquid crystal 140 and then turns to linearly polarized light in a direction perpendicular to the paper surface without a change of its polarizing direction by the TN liquid crystal 140, and subsequently is absorbed by the polarizer 130, thereby producing darkness.

As described above, in the case of the transmissive display, in the voltage non-applied section 120, it is possible to effectively use almost all the light owing to the polarized light splitter 160, thus offering extreme brightness. In the voltage applied section 110, the polarizer 130 performs the absorption to produce darkness. Accordingly, in the state where the light source 190 comes on, a black display is attainable on the background of the light source color. That is, it is possible to gain a monochrome display without causing the positive-negative reversal between the transmissive display relying on the light source light and the reflective display (see FIG. 2) relying on the external light.

Incidentally, although the above description relates to the normally white mode, the normally black is also acceptable. However, in the normally white mode, the brightness effect not only in the reflective display but also in the transmissive display is still exhibitable.

In addition, in the above description, although the TN liquid crystal 140 has been used as an example, even if in place of the TN liquid crystal 140 there is employed another device such as a STN liquid crystal or an ECB (Electrically Controlled Birefringence) liquid crystal in which the polarization axis is changeable by voltages or the like, the basic operational principle is the same.

A description will be given hereinbelow of first to sixth embodiments based on the operational principle described above with reference to FIGS. 1 to 3.

First Embodiment

Figure 4:
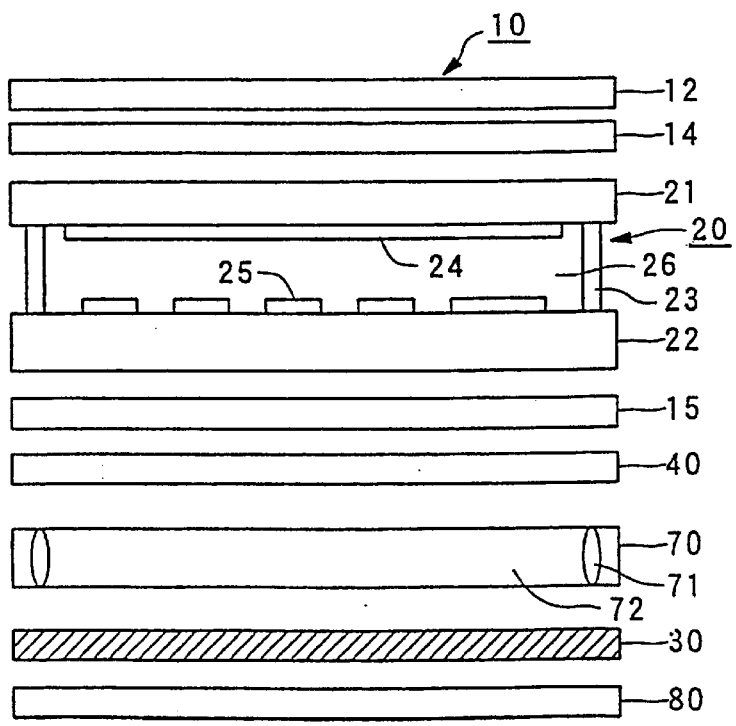
FIG. 4 is an exploded cross-sectional view for explaining a display device according to the first embodiment of this invention.

FIG. 4 is an exploded cross-sectional view for explaining a display device according to a of this invention.

In the display device 10 according to this embodiment, as one example of the polarization axis variable means, an STN cell 20 is put to use. Above the STN cell 20, a retardation film 14 and a polarizer 12 are provided in this order. Under the STN cell 20, a polarizer 15 and a polarized light splitter 40 are provided in this order. Additionally, there is placed a light source 70 whereby light can be incident on the polarized light splitter 40 from the under. An LED (Light Emitting Diode) 71 is employed as the light source 70, and light therefrom is emitted upwardly through a light guide 72. Under the light guide 72, a diffusion plate 30 is provided as one example of light diffusion means and a reflecting plate 80 is set as one example of light reflecting means. In FIG. 4, for convenience in the description, the respective members are shown in a state spaced from each other, but in fact these members are disposed in a state adhered closely to each other.

As preferable transparent materials for formation of the light guide 72, there are transparent resins such as an acrylic resin, a polycarbonate resin and an amorphous polyolefine resin, inorganic transparent materials such as a glass, and complexes thereof. The thickness is 0.3 to 2 mm. Small projections exist on its surface, and the size of the projections is required to be above approximately 5 $\mu$m for the prevention of the influence of the diffraction, because the wavelength of the visible light is approximately from 380 nm to 700 nm. Additionally, in order to prevent us from caring about the projections when seeing with the naked eye, preferably the size thereof is below approximately 300 $\mu$m. Still additionally, taking the convenience in production into consideration, preferably the size of the projections is approximately above 10 μm but below 100 μm. Moreover, the ratio between the height of the projections and the width thereof (if it has a general cylindrical configuration, its diameter) can be less than 1:1. In this embodiment, the configuration of the projections is a cylinder having a diameter of 20 μm and a height of 15 μm, and the pitch is 20μm.

The reflecting plate 80 is made in a manner that aluminum is deposited on a PET film or silver is deposited thereon, alternatively it can be an aluminum foil or the like. As the configuration of the surface of the reflecting plate 80, a mirror surface or a scattering surface is acceptable.

In the STN cell 20, an STN liquid crystal 26 is enclosed in a cell comprising two glass substrates 21 and 22 and a seal member 23. A transparent electrode 24 is put on a lower surface of the glass substrate 21 while a transparent electrode 25 is placed on an upper surface of the glass substrate 22. As the transparent electrodes 24 and 25, it is possible to use an ITO (Indium Tin Oxide), a tin oxide or the like. The retardation film 14 is used as a color compensation optical anisotropy, and is used for correcting the coloring made in the STN cell 20. As the polarized light splitter 40 in this embodiment, the polarized light splitter described with reference to FIG. 1 is put to use.

Secondly, a description will be given of an operation of the display device 10 according to this embodiment.

First, the description will begin at a reflective display utilizing the external light.

In the voltage non-applied area, the external light becomes linearly polarized light in a predetermined direction due to the polarizer 12, and then its polarizing direction is twisted a predetermined angle by means of the STN cell 20. This linearly polarized light passes through the polarizer 15 and the polarized light splitter 40 and further passes through the light guide 72, thereafter being reflected on the reflecting plate 80. The reflected light again passes through the light guide 72, the polarized light splitter 40 and the polarizer 15 and reaches the STN cell 20 where its polarizing direction is twisted by a predetermined angle, finally emerging as linearly polarized light from the polarizer 12. Also, the light whose polarizing direction is changed in the reflecting plate 80 is repeatedly reflected between the polarized light splitter 40 and the reflecting plate 80 and advances from the polarized light splitter 40 to the STN cell 20 in due course, thus producing a bright display. Since the diffusion plate 30 is provided between the STN cell 20 and the polarized light splitter 40, the reflected light from the polarized light splitter 40 becomes white.

On the other hand, in the voltage applied area, the natural light becomes linearly polarized light in a predetermined direction by means of the polarizer 12, and then passes through the STN cell 20 as linearly polarized light and is absorbed by the polarizer 15, thus producing darkness.

Furthermore, a description will be given of a transmissive display using light source light.

When the light source comes on, in the voltage non-applied area, light emitted from the light source 70 forms linearly polarized light through the polarized light splitter 40 and penetrates it. This linearly polarized light is evolved into linearly polarized light in a predetermined direction by the STN cell 20 and then outputted without being absorbed by the polarizer 12.

On the other hand, in the voltage applied area, light emitted from the light source 70 becomes linearly polarized light through the polarized light splitter 40 and penetrates it. This linearly polarized light is developed into linearly polarized light in a predetermined direction by the STN cell 20 and is absorbed by the polarizer 12. That is, darkness takes place.

In consequence, not only under the external light but also under the light source lighting, it is possible to provide a bright positive display in which black appears on the background of white, with no positive-negative reversal. Additionally, since the diffusion plate 30 is provided between the STN cell 20 and the reflecting plate 80, even if the distance therebetween is long, it is possible to reduce the double image and bleeding in the reflective display. Still additionally, since the polarized light splitter 40 enables the effective utilization of light, it is possible to offer both bright reflective and transmissive displays.

FIG. 5 is a schematic illustration for explaining a liquid crystal display device according to a second embodiment of this invention. The second embodiment differs from the above-described first embodiment in that the diffusion 30 is positioned above the light guide 72. Other constructions are the same as those in the first embodiment. In FIG. 5, the components similar to those in FIG. 4 are marked with the same reference numerals, and the description thereof will be omitted.

FIG. 6 shows a display according to the first embodiment and a display according to the second embodiment, designated at (A) and (B), respectively, with both displaying "EPSON". Combined with an image appearing on the liquid crystal layer, a shadow appears dimly on the diffusion plate 30 due to the reflection on the reflecting plate 80. In this first embodiment, the shadow is seen dimly at a rear side corresponding to the thickness of the light guide 72, while in the second embodiment, the shadow does not lie deep, so the image is easier to see. In FIG. 6, for comparison in operation between the second embodiment and the first embodiment, the double image is shown remarkably. But in fact, since the diffusion plate 30 is provided between the STN cell 20 and the reflecting plate 80 as mentioned above in the first embodiment, although inferior to the second embodiment, also in the first embodiment the double image or bleeding is reducible in the reflective display.

Figure 7:
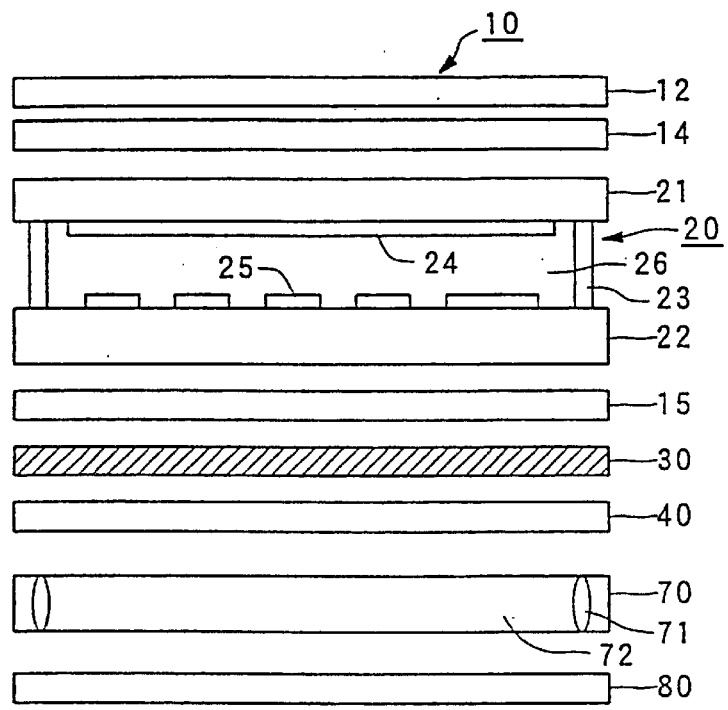
FIG. 7 is an exploded cross-sectional view for explaining a display device according to the third embodiment of this invention.

FIG. 7 is a schematic illustration for explaining a liquid crystal display device according to a third embodiment of this invention. The third embodiment differs from the above-described embodiment in that the diffusion plate 30 is positioned above the polarized light splitter 40. Other constructions are the same as those in the first embodiment. In FIG. 7, components corresponding to those in FIG. 4 are marked with the same reference numerals, and the description thereof will be omitted.

With the third embodiment, the distance between the diffusion plate 30 and the STN cell 20 is shortened, and double image, as illustrated in FIG. 6, or bleeding in display is reducible accordingly.

Fourth Embodiment

A differs from the above-described third embodiment in that a pressure sensitive adhesive containing a diffusing agent is used as the diffusion plate 30. Other constructions are the same as those in the first embodiment.

According to the fourth embodiment, as well as the third embodiment, double image, see FIG. 6, or bleeding in display is reducible. In addition, as seen in FIG. 7, the polarizer 15 and the polarized light splitter 40, integrated with each other, can be adhered to the STN cell 20, which is advantageous in manufacturing.

Figure 8:
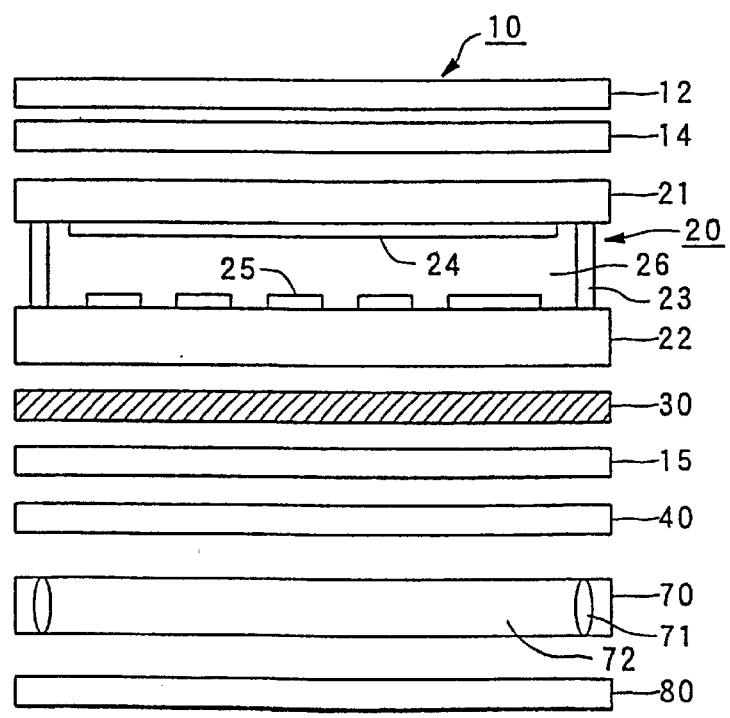
FIG. 8 is a schematic cross-sectional view for explaining a display device according to the fifth embodiment of this invention.

FIG. 8 is a schematic illustration for explaining a liquid crystal display device according to a fifth embodiment of this invention. The difference of the fifth embodiment from the above-described first embodiment is that the diffusion plate 30 is positioned above the polarizer 15. Other constructions are the same as those in the first embodiment. In FIG. 8, components corresponding to those in FIG. 4 are marked with the same reference numerals, and the description thereof will be omitted.

According to the fifth embodiment, the distance between the diffusion plate 30 and the STN cell 20 is shortened, and the double image, as is illustrated in FIG. 6, or the bleeding is reducible accordingly.

The difference of a sixth embodiment from the above-described fifth embodiment is that, in place of the polarized light splitter described with reference to FIG. 1, a combination of a circularly polarizer, constructed with a cholesteric liquid crystal or the like, and a λ/4 plate is used as the polarized light splitter 40. Other constructions are the same as those in the first embodiment.

According to the sixth embodiment, as in the case of the fifth embodiment, the double image, as is illustrated in FIG. 6, or the bleeding is reducible.

Figure 9:
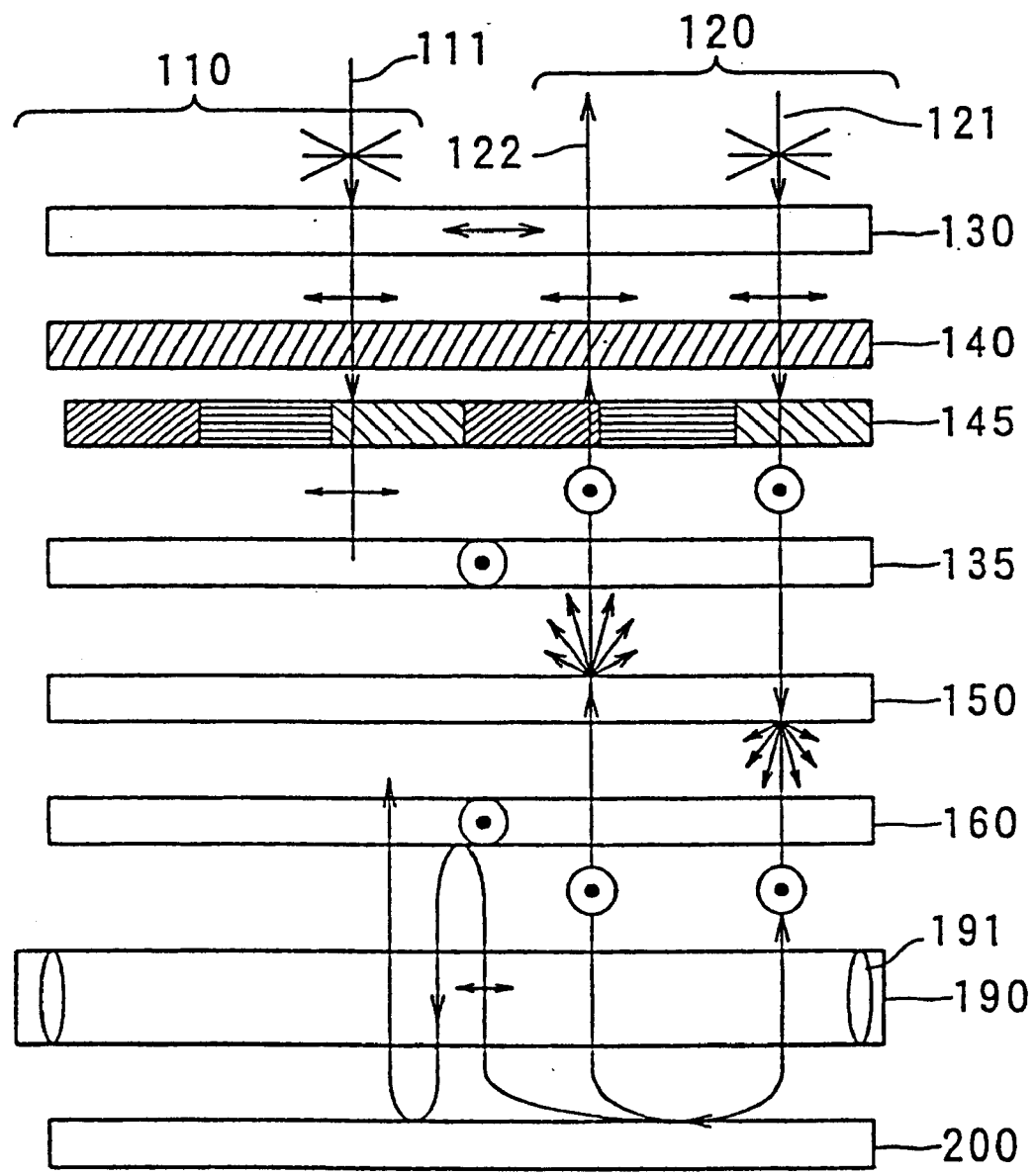
FIG. 9 is an illustration for explaining the principle of a reflective display of color display devices according to seventh to fifteenth embodiments of this invention.
Figure 10:
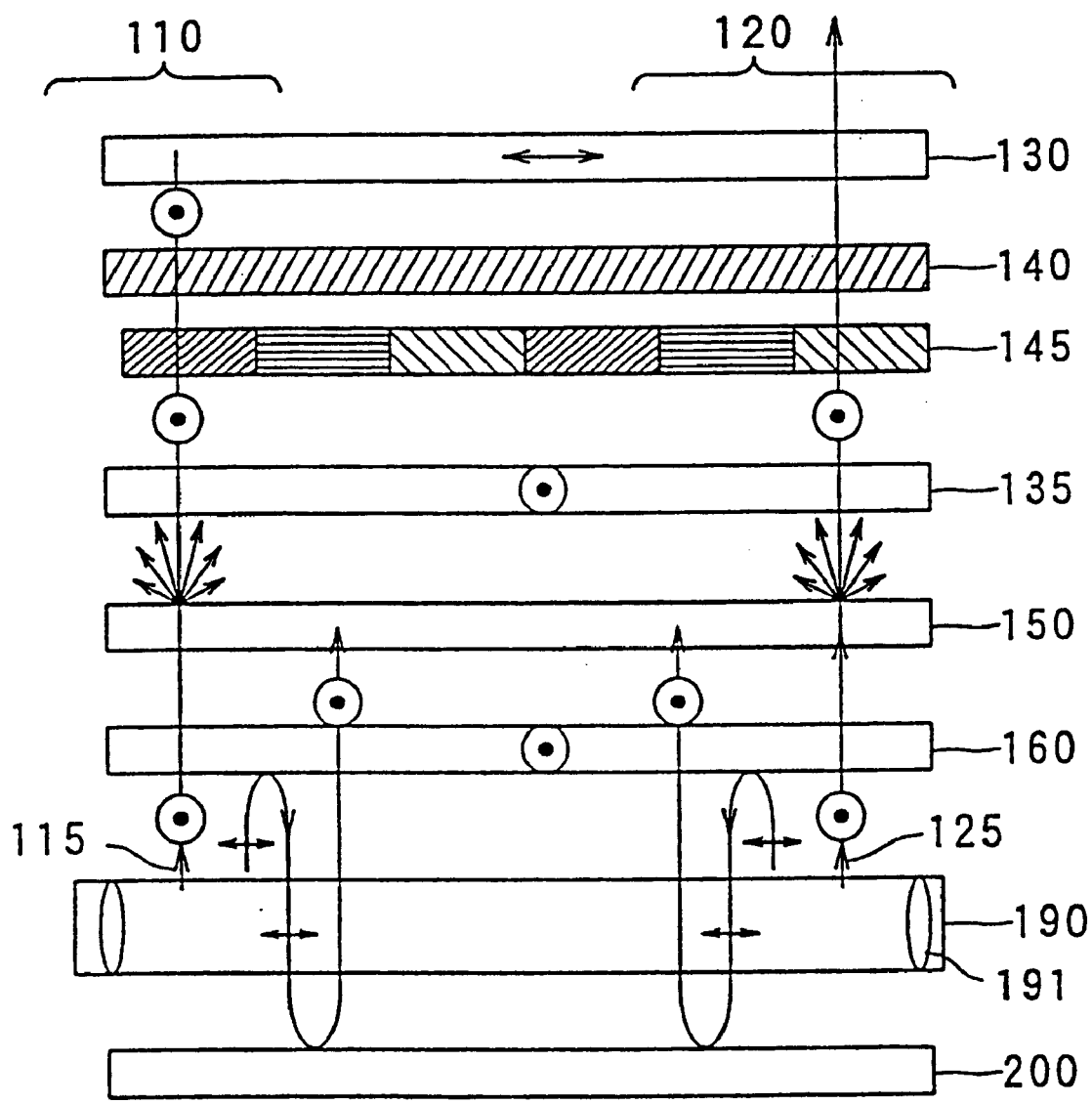
FIG. 10 is an illustration for explaining the principle of a transmissive display of the color display devices according to the seventh to fifteenth embodiments of this invention.

Furthermore, referring to FIGS. 9 and 10, a description will be given of an operational principle of a color display device related to seventh to fifteenth embodiments of this invention which will be described later. FIG. 9 is an illustration for explaining a case in which the external light is incident on a color display device using the polarized light splitter shown in FIG. 1 (that is, a reflective display), while FIG. 10 is an illustration for describing a case in which a light source goes on in this color display device (that is, a transmissive display). In FIGS. 9 and 10, components corresponding to those in FIGS. 2 and 3 are marked with the same reference numerals, and they will be omitted from the description.

In FIGS. 9 and 10, this display device is equipped with a color filter 145 forming one example of coloring means and adjacent to the lower side of the TN liquid crystal 140.

First, referring to FIG. 9, a description will be given of the case of the external light incidence (that is, the reflective display), assuming that the left side of this display device under the external light is used as a voltage applied section 110 and the right side thereof is used as a voltage non-applied section 120.

In the voltage non-applied section 120 on the right side, the natural light 121 turns to linearly polarized light in a direction parallel with the paper surface through the polarizer 130 and then forms linearly polarized light in a direction perpendicular to the paper surface with its polarizing direction being twisted 90° by the TN liquid crystal 140, and further passes through the color filter 145 and penetrates through the polarizer 135 as linearly polarized light in a direction perpendicular to the paper surface. This linearly polarized light is evolved into white scattering light by the light scattering layer 150, and is developed into linearly polarized light in a direction perpendicular to the paper surface by the polarized light splitter 160, before passing through this polarized light splitter 160. Additionally, this light passes through the transparent light guide 190 and is reflected on the reflecting plate 200 to again pass through the light guide 190 and the polarized light splitter 160 as linearly polarized light in a direction perpendicular to the paper surface. This linearly polarized light is again evolved into white scattering light by the light scattering layer 150 and then is developed into linearly polarized light in a direction perpendicular to the paper surface by the polarizer 135, before passing through this polarizer 135. Still additionally, after passing through the color filter 145, the linearly polarized light becomes a linearly polarized light in a direction parallel with the paper surface with its polarizing direction being twisted 90° by the TN liquid crystal, and outputted from the polarizer 130 as linearly polarized light 122 in a direction parallel with the paper surface.

Particularly in this invention, since the light scattering layer 150 is provided between the polarizer 135 and the polarized light splitter 160, when the light 122 is viewed from the polarizer 130 side, it seems that the scattering plane of the light diffusion layer 150 whereby the reflected light is scattered forwardly is at the reflecting position. That is, owing to the forward scattering in the light diffusion layer 150, images or shadows are hardly seen on the rear side of the light diffusion layer 150. Accordingly, even if, in the construction of the device, the distance from the TN liquid crystal 140 to the reflecting plate 200 is prolonged, double image or bleeding in display, caused by the parallax resulting therefrom, particularly bleeding of the colors produced by the color filter 145, does not occur.

Moreover, the light reflected on the reflecting plate 200 includes, in addition to the linearly polarized light in the direction perpendicular to the paper surface, linearly polarized light in a direction parallel with the paper surface. The linearly polarized light in the direction parallel with the paper surface is reflected on the polarized light splitter 160 and again reflected on the reflecting plate 200 so that its polarizing direction varies; whereupon, a portion of the linearly polarized light forms linearly polarized light in a direction perpendicular to the paper surface which in turn, passes through the polarized light splitter 160. The repetition of this operation enables effective utilization of light for brightness. In this way, in the voltage non-application, the incident light can effectively be utilized owing to the polarized light splitter 160, thereby offering a bright display.

In the voltage applied section 110 on the left side, the natural light 111 turns through the polarizer 130 to linearly polarized light in a direction parallel with the paper surface, and then passes through the TN liquid crystal 140 without a change of its polarizing direction, and is absorbed by the polarizer 135, thereby producing darkness.

As described above, in the case of the reflective display, in the voltage non-applied section 120, the light reflected on the reflecting plate 200 is scattered forwardly by the light scattering layer 150 to be evolved into white scattering light, so double image or bleeding in display, particularly bleeding of colors produced by the color filter 145, is reducible, and further the polarized light splitter 160 accomplishes effective utilization of light to produce a bright display. On the other hand, in the voltage applied section 110, light is absorbed by the polarizer 135 to produce darkness, so high contrast is obtainable.

Furthermore, referring to FIG. 10, a description will be given of a case in which the light source 191 comes on (that is, the transmissive display). The display device shown in FIG. 10 is identical to that shown in FIG. 9.

In the voltage non-applied section 120 on the right side, of the light source light 125, linearly polarized light in a direction perpendicular to the paper surface passes through the polarized light splitter 160. On the other hand, of the light source light 125, linearly polarized light in a direction parallel with the paper surface is reflected on the polarized light splitter 160 and again reflected on the reflecting plate 200 so that its polarizing direction varies; whereupon, a portion thereof forms linearly polarized light in a direction perpendicular to the paper surface and passes through the polarized light splitter 160. The repetition of this operation enables the passing of almost all the light through the polarized light splitter 160. The linearly polarized light in the direction perpendicular to the paper surface, passing through the polarized light splitter 160, is formed through the light scattering layer 150 into white scattering light and then developed into linearly polarized light in a direction perpendicular to the paper surface by means of the polarizer 135, before passing through this polarizer 135. Subsequently, after passing through the color filter 145, the linearly polarized light becomes linearly polarized light in a direction parallel with the paper surface with its polarizing direction being twisted 90° by the TN liquid crystal 140, then passing through the polarizer 130. That is, an extreme display is attainable though the effective utilization of almost all the light.

In the voltage applied section 110 on the left side, as in the voltage applied section 120, light source light 115 reaches the TN liquid crystal 140 to form linearly polarized light in a direction perpendicular to the paper surface without a change of its polarizing direction, and is absorbed by the polarizer 130 into darkness.

As described above, in the case of the transmissive display, in the voltage non-applied section 120, the polarized light splitter 160 permits effective utilization of light for extreme brightness, while in the voltage applied section 110, the light is absorbed by the polarizer 130 into darkness. Accordingly, at the lighting of the light source 190, a color display is obtainable on the background of the light source color. That is, a color display is feasible without positive-negative reversal in the transmissive display (see FIG. 3) relying on the light source light and in the reflective display (see FIG. 2) relying on the external light.

Particularly, in this case, since the color pitch of the color filter 145 is, for example, as fine as approximately 80 μm, in the reflective display, the incident light and the outgoing light (that is, reflected light) related to the same external light portion passing through a going and returning optical path at least between the color filter 145 and the reflecting plate 200 (an optical path includes, in addition to this optical path, one or a plurality of going and returning optical paths between the reflecting plate 200 and the polarized light splitter 160) considerably longer than this pitch substantially pass through different color portions of the color filter 145. However, since the light scattering layer 150 is interposed between the polarizer 135 and the polarized light splitter 160, even if the incident light passes through the color portions of the color filter 145 to be colored before reflected, when passing through the light scattering layer 150, the light passing through the color portions of the color filter 145 is diffused forwardly, and further diffused forwardly in again passing through the light scattering layer 150 as the outgoing light reflected on the reflecting plate 200. In consequence, the red, green and blue lights resulting from the passing of the incident light through the color filter 145 are mixed with each other to produce an optical condition almost identical to an optical condition in which, when viewed from the polarizer 130 side, white scattering light is emitted from the scattering plane of the light scattering layer 150 and is incident on the color filter 145 in this state. Thus, irrespective of what color of the color filter 145 the incident light passes through, the color of the outgoing light becomes the color of the color filter 145 through which the outgoing light passes. Accordingly, even if the distance from the TN liquid crystal 140 to the reflecting plate 200 is prolonged in the device construction, the bleeding of the color produced through the color filter 145 does not occur, which is very advantageous.

Incidentally, if the color filter 145 shows a dot matrix display of red, green and blue, on this principle, multi-color and full-color display is feasible.

Although the above description relates to the normally white mode, the normally black is also acceptable. However, in the normally white mode, the brightness effect not only in the reflective display but also in the transmissive display is still exhibitable.

In addition, in the above description, although the TN liquid crystal 140 has been used as an example, even if in place of the TN liquid crystal 140 there is employed another device such as a STN liquid crystal or an ECB (Electrically Controlled Birefringence) liquid crystal in which the polarization axis is changeable by voltages or the like, the basic operational principle is the same.

A description will be given hereinbelow of seventh to fifteenth embodiments based on the operational principle described above with reference to FIGS. 9 and 10.

Figure 11:
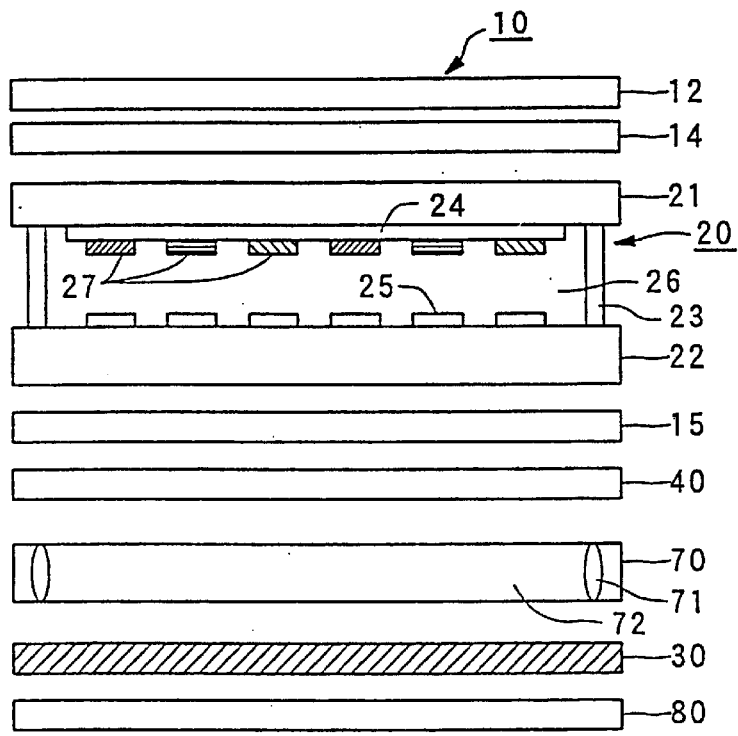
FIG. 11 is an exploded cross-sectional view for explaining a display device according to the seventh embodiment of this invention.

FIG. 11 is a schematic illustration for explaining a liquid crystal display device according to a seventh embodiment of this invention. The seventh embodiment differs from the above-described first embodiment in that color filters 27 is provided in the interior of the STN cell 20. Other constructions are the same as those in the first embodiment. In FIG. 11, components corresponding to those in FIG. 4 are marked with the same reference numerals, and the description thereof will be omitted.

More concretely, in FIG. 11, the transparent electrode 24 is placed on a lower surface of the glass substrate 21 and transparent electrodes 25 are put on an upper surface of the glass substrate 22 to form a dot matrix, with red, green and blue color filters 27 being formed on a lower surface of the transparent electrode 24 to coincide with the electrode pattern of the transparent electrodes 25. The retardation film 14 is made to correct the coloring by the STN cell 20 for achromatic display. The direction of the polarization axis of the polarized light splitter 40 coincides with the direction of the polarization axis of the polarizer 15.

Secondly, a description will be given of an operation of the display device 10 according to this embodiment.

The description begins at a reflective display using the external light.

Under the external light, in a voltage non-applied area, the natural light becomes linearly polarized light in a predetermined direction by means of the polarizer 12, and turns to linearly polarized light with its polarizing direction being twisted a predetermined angle by the STN cell 20, and further passes through the polarizer 15 and the polarized light splitter 40, and even passes through the light guide 72 to be reflected on the reflecting plate 80. The reflected light again passes through the light guide 72 and the polarized light splitter 40 and the polarizer 15 and is outputted as linearly polarized light from the polarizer 12 after its polarizing direction is twisted a predetermined angle. Furthermore, also the light whose polarizing direction is changed by the reflecting plate 80 is repeatedly reflected between the polarized light splitter 40 and the reflecting plate 80, and eventually comes out of the polarized light splitter 40 and advances to the STN cell 20, thereby obtaining a bright display. At this time, if the light passes through the color filter 27, one of the red, green and blue colors develops. Since the diffusion plate 30 is provided between the STN cell 20 and the polarized light splitter 40, the reflected light from the polarized light splitter 40 is scattered, thus providing a wide-visible-angle and good-looking display while suppressing the color bleeding.

On the other hand, in the voltage applied area, the natural light becomes linearly polarized light in a predetermined direction by means of the polarizer 12, and then passes through the STN cell 20 as the linearly polarized light, and further is absorbed by the polarizer 15, thereby producing darkness.

Secondly, a description will be made of a transmissive display using light source light.

Under the lighting of the light source 70, the light emitted from the light source 70 becomes linearly polarized light through the polarized light splitter 40, before passing through it. This linearly polarized light becomes linearly polarized light in a predetermined direction by means of the STN cell 20, and is outputted without being absorbed by the polarizer 12. At this time, when the light passes through the color filter 27, one of the red, green and blue colors appears.

On the other hand, in the voltage applied area, the light emitted from the light source 70 becomes linearly polarized light by the polarized light splitter 40 and passes therethrough. This linearly polarized light turns to linearly polarized light in a predetermined direction through the STN cell 20, and is absorbed by the polarizer 12, thereby producing darkness.

As a result, a color display is obtainable not only under the external light but also under the lighting of the light source without positive-negative reversal by the color filter 27. Additionally, since the diffusion plate 30 is placed between the STN cell 20 and the reflecting plate 80, even if the distance therebetween is long, double image or bleeding (particularly, color bleeding) is reducible in the reflective display. Still additionally, since the polarized light splitter 40 enables the effective utilization of light, brightness is producible in both reflective and transmissive displays.

Examining the optical anisotropy in a plane of the light guide 190, chrominance non-uniformity occurs at a place having an anisotropy above 400 nm, whereas no chrominance non-uniformity occurs at a place having an anisotropy below 150 nm. Accordingly, it is preferable that the optical anisotropy in a plane of the light guide 190 is set to be below 400 nm, most preferably below 150 nm.

Figure 12:
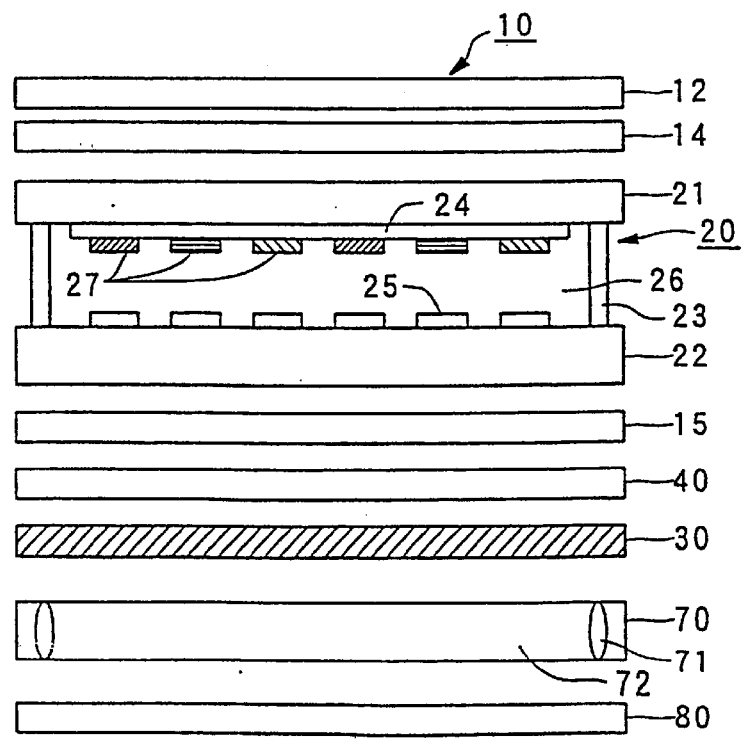
FIG. 12 is an exploded cross-sectional view for explaining the display device according to the eighth embodiment of this invention.

FIG. 12 is a schematic illustration for explaining a liquid crystal display device according to an eighth embodiment of this invention. The difference of the eighth embodiment from the above-described seventh embodiment is that the diffusion plate 30 is positioned above the light guide 72. Other constructions are the same as those in the seventh embodiment. In FIG. 12, components corresponding to those in FIG. 11 are marked with the same reference numerals, and the description thereof will be omitted.

A display according to the seventh embodiment and a display according to the eighth embodiment are shown at (A) and (B) in FIG. 6, respectively, as in the case of the display according to the first embodiment and the display according to the second embodiment. That is, in the seventh embodiment, a shadow clearly appears on the rear side corresponding to the thickness of the light guide 72, whereas in the eighth embodiment, the shadow becomes dim so that the display is easy to see.

In the ninth embodiment according to this invention, in addition to the above-described construction according to the eighth embodiment, provided is a color filter 24 of red, green and blue, different in transmittance ratio.

When the average transmittance ratio of the color filter 24 is changed variously, if the average transmittance ratio exceeds 80%, the color purity drops so that the color recognition decreases. On the other hand, if the average transmittance ratio becomes below 30%, the brightness in the reflective display decreases so that the display is hard to read. Accordingly, preferably the average transmittance ratio of the color filter 24 is in a range of 30 to 80%, more preferably in a range of 45 to 70%.

Figure 13:
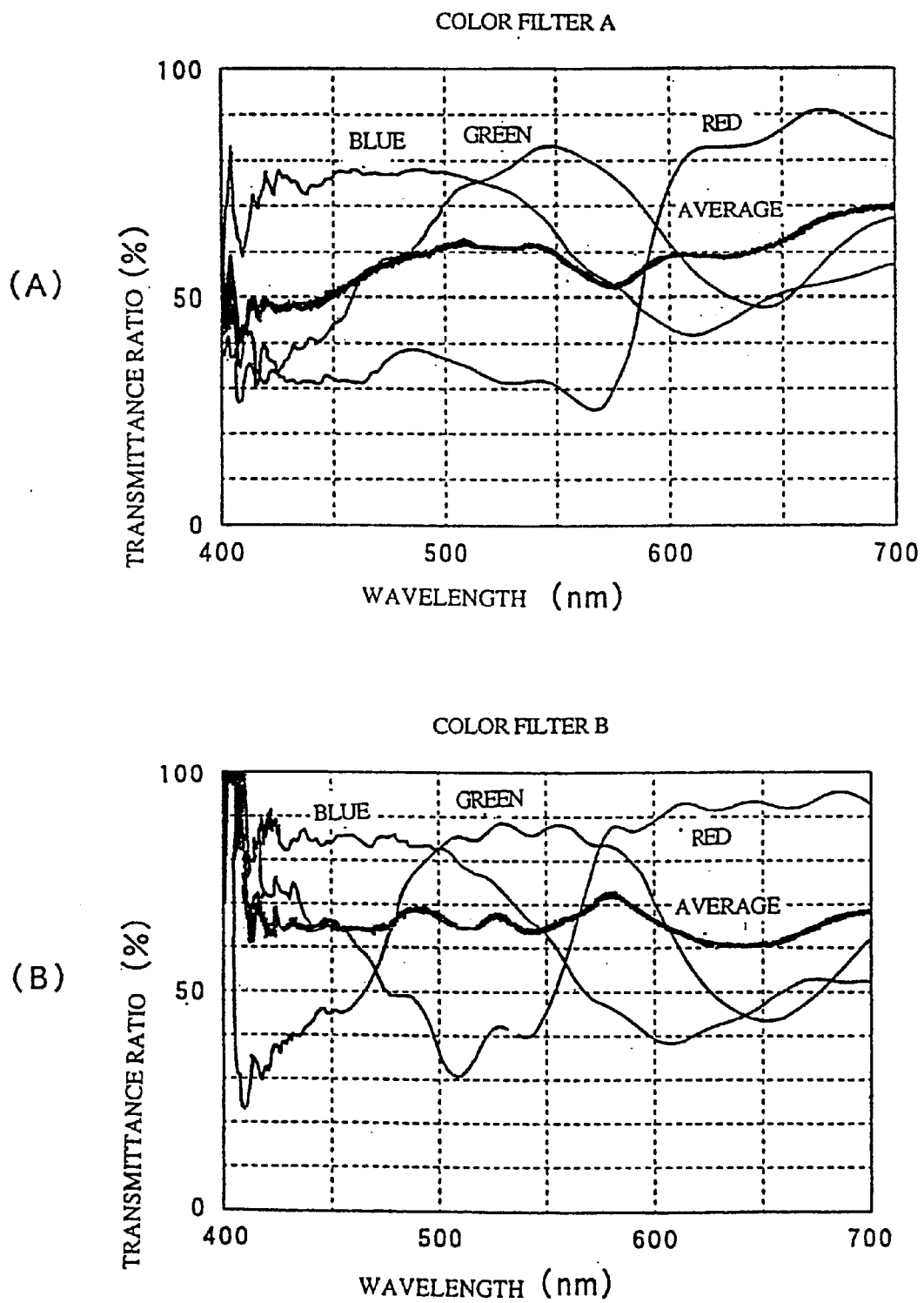
FIG. 13 is a characteristic illustration of a characteristic of a color filter for use in the display device according to the ninth embodiment of this invention.

The spectral characteristics of two kinds of color filters A and B different in average transmittance ratio from each other in the ninth embodiment are shown in FIGS. 13(a) and (b), respectively. The average transmittance ratio of the color filter A is 58.1% while the average transmittance ratio of the color filter B is 67.7%. Furthermore, FIG. 14, in the form of a table, shows transmittance ratios and chromaticities of red, green and blue in the color filters A and B.

As seen from the table of FIG. 14, as compared with the use of the color filter B, in the case of the employment of the color filter A, although the reflective display is relatively dark, a display having an excellent color purity is attainable, so this is preferable.

Figure 15:
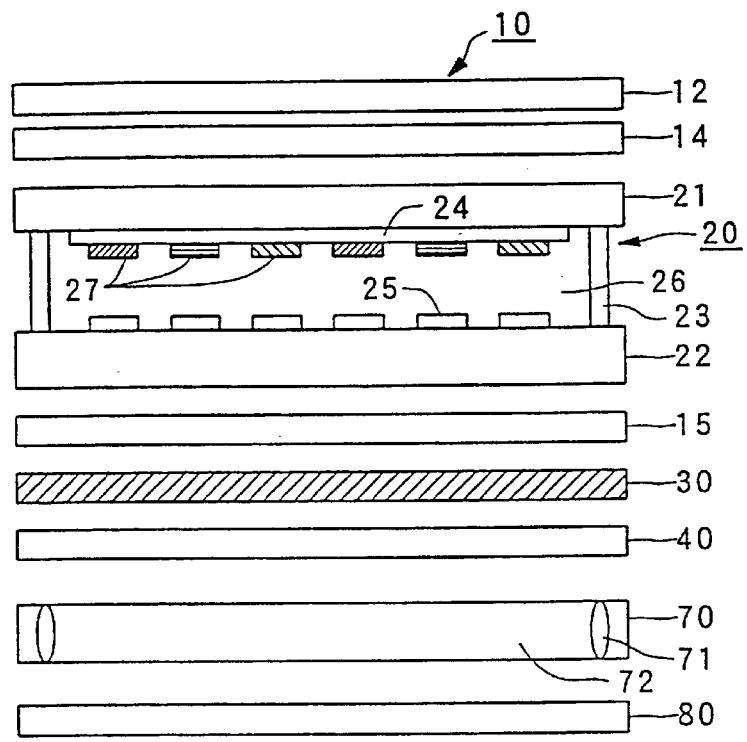
FIG. 15 is an exploded cross-sectional view for explaining the display device according to the tenth embodiment of this invention.

FIG. 15 is a schematic illustration for explaining a liquid crystal display device according to a tenth embodiment of this invention. The difference of the tenth embodiment from the above-described seventh embodiment is that the diffusion plate 30 is positioned above the polarized light splitter 40. Other constructions are the same as those in the seventh embodiment. In FIG. 15, components corresponding to those in FIG. 11 are marked with the same reference numerals, and the description thereof will be omitted.

According to the tenth embodiment, the distance between the diffusion plate 30 and the STN cell 20 is shortened, so the double image, shown in FIG. 6, and bleeding in display is reducible accordingly.

A difference of an eleventh embodiment from the above-described tenth embodiment is that a pressure sensitive adhesive containing a diffusing agent is used as the diffusion plate 30. Other constructions are the same as those in the tenth embodiment.

According to the eleventh embodiment, as well as the tenth embodiment, the double image, shown in FIG. 6, and bleeding in display is reducible. In addition, the polarizer 15 and the polarized light splitter 40 in FIG. 15 are integrally adhered onto the STN cell 20, which is advantageous in manufacturing.

Figure 16:
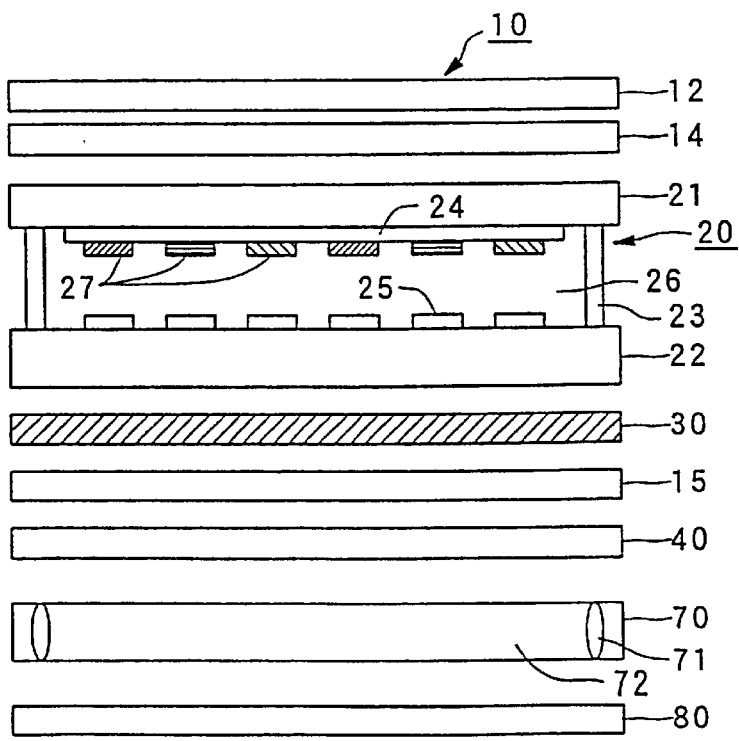
FIG. 16 is an exploded cross-sectional view for explaining the display device according to the twelfth embodiment of this invention.

FIG. 16 is a schematic illustration for explaining a liquid crystal display device according to a twelfth embodiment of this invention. The twelfth embodiment differs from the above-described seventh embodiment in that the diffusion plate 30 is positioned above the polarizer 15. Other constructions are the same as those in the seventh embodiment. In FIG. 16, parts corresponding to those in FIG. 11 are marked with the same reference numerals, and the description thereof will be omitted.

According to the twelfth embodiment, the distance between the diffusion plate 30 and the STN cell 20 is shortened, so the double image, shown in FIG. 6, or bleeding in display is reducible accordingly.

The difference of a thirteenth embodiment from the above-described tenth embodiment is that, in place of the polarized light splitter described with reference to FIG. 1, a combination of a circularly polarizer, constructed with a cholesteric liquid crystal or the like, and a λ/4 plate is used as the polarized light splitter 40. Other constructions are the same as those in the tenth embodiment.

According to the thirteenth embodiment, as in the case of the tenth embodiment, the double image, see FIG. 6, or the bleeding is reducible.

Figure 17:
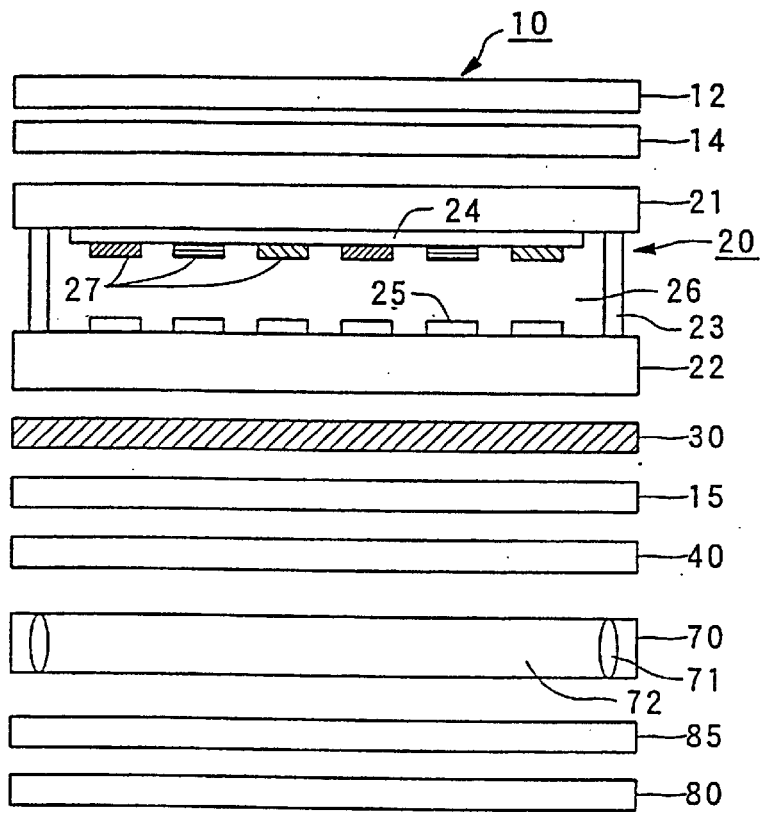
FIG. 17 is an exploded cross-sectional view for explaining the display device according to the fourteenth embodiment of this invention.

FIG. 17 is a schematic illustration for explaining a liquid crystal display device according to a fourteenth embodiment of this invention. The fourteenth embodiment differs from the above-described twelfth embodiment in that a Lumisty85 produced by Sumitomo Chemical Co., Ltd. is placed on an upper surface of the reflecting plate 80. Other constructions are the same as those in the twelfth embodiment. In FIG. 17, parts corresponding to those in FIG. 16 are marked with the same reference numerals, and the description thereof will be omitted.

Figure 18:
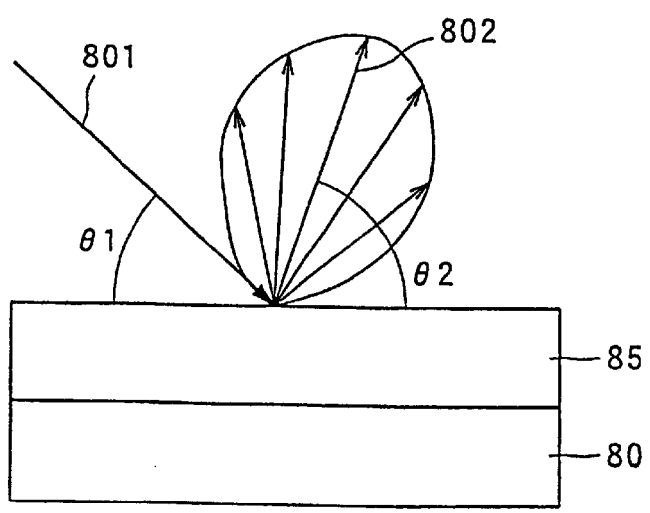
FIG. 18 is an illustration for explaining the display device according to the fourteenth embodiment of this invention.

The "Sumitomo Chemical Produced Lumisty85" exhibits an effect to make the output angle θ2 of light differ from the incidence angle θ1 as shown in FIG. 18 when combined with the reflecting plate 80. That is, when incident light 801 is incident on the Lumisty85 at the incidence angle θ1, the light 801 is outputted as diffused light. At this time, the output angle in the direction 802 having the highest intensity is taken as θ2. Thus, the incidence angle θ1 and the output angle θ2 differ from each other. This is because the Lumisty has the following structure and characteristic. In the Lumisty, layers different in refractive index from each other are arranged at an interval of approximately 3 μm in a film, and this construction causes a diffraction phenomenon to produce diffusion of light. The directional control of the diffused light is possible through the adjustment of the layer construction. When the incidence angle is 70°, the output angle is 90°. In this way, when a screen is viewed from the vertical direction, the screen is bright and easy to see without being dark due to the shadow of the observer. Additionally, the contrast also upgrades.

In addition, even if a prism sheet or a hologram is used in place of the Lumisty, similar effects are obtainable.

Figure 19:
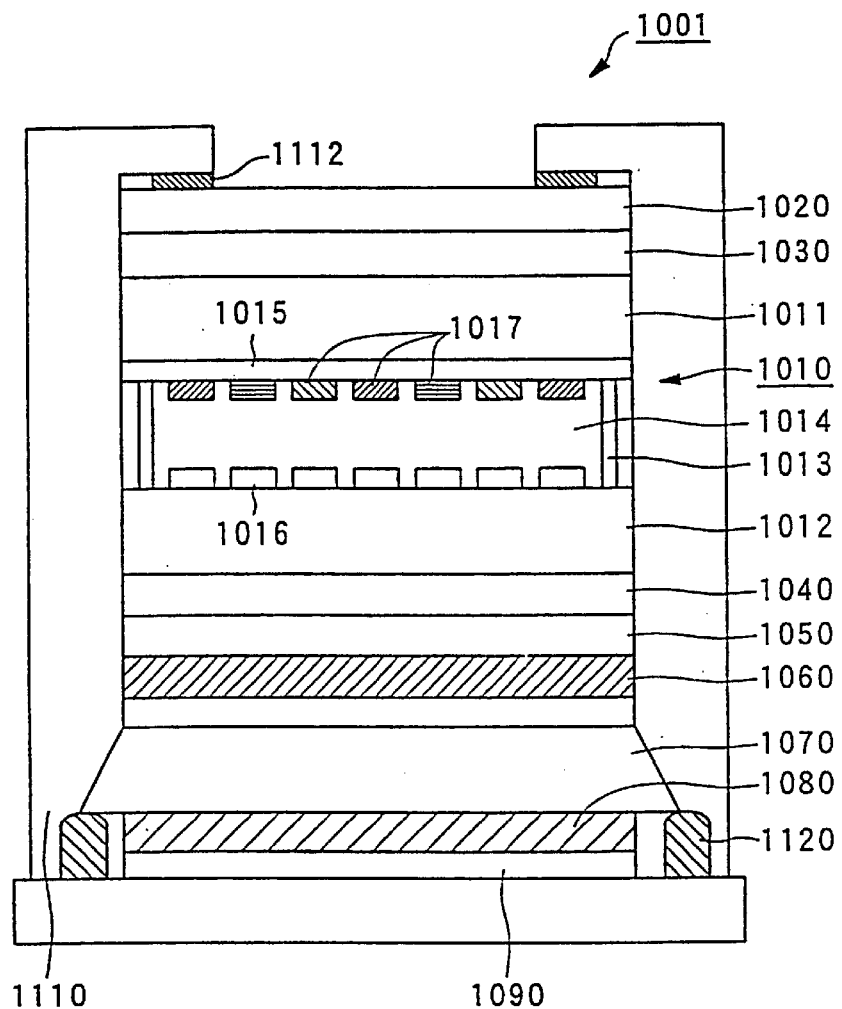
FIG. 19 is schematic cross-sectional view for explaining the display device according to the fifteenth embodiment of this invention.

As shown in FIG. 19, in a liquid crystal display device 1001 according to this embodiment, a liquid crystal cell 1010 having an STN liquid crystal is used as one example of polarization axis variable means. Above the liquid crystal cell 1010, a retardation film 1030 and an upper polarizer 1020 forming one example of a first polarized light splitter are located in this order. Under the liquid crystal cell 1010, a lower polarizer 1040 forming one example of a second polarized light splitter, a pressure sensitive adhesive 1050 containing a light diffusing agent, forming one example of light diffusing means, a polarized light splitter 1060 forming a third polarized light splitting means, a light guide plate 1070 constituting a portion of the light guider and a reflecting plate 1080 forming one example of light reflecting means are provided in this order. The pressure sensitive adhesive 1040 containing light diffusing agent has both functions: a light diffusion effect and an adhesion effect, and the lower polarizer 1040 and the polarized light splitter 1060 are adhered. Additionally, a pressure sensitive adhesive also lies on an upper surface of the lower polarizer 1040, and it can be adhered to the liquid crystal cell 10.

In the liquid crystal cell 1010, an STN liquid crystal 1014 is enclosed in a cell comprising two glass substrates 1011 and 1012 and a seal member 1013. The product Δn×Δd of the optical anisotropy Δn of the STN liquid crystal 1014 in the liquid crystal cell 1010 and the thickness d of the liquid crystal layer is set at, for example, 860 nm. Transparent electrode lines 1015 and 1016 are formed inside the two glass substrates 1011 and 1012, respectively. Additionally, to the transparent electrode lines 1016 of the lower glass substrate 1012, red, green and blue color filters 1017 are located on the transparent electrode line 1015 of the upper glass substrate 1011. The use of the retardation film 1030 is for accomplishing the color compensation.

An LED 1120 forming one example of a light source is located on a PCB substrate 1090 so that light is emitted upwardly from the LED 1120. In addition, for the introduction of light from the LED 1120, together with the light guide plate 1070, a light guide 1110 forming one example of the light guider is provided on the PCB substrate 1090. Still additionally, the left and right positions of the liquid crystal cell 1010 and others are determined by the light guide 1110, and a structure comprising the liquid crystal cell 1010 and others is fixed thereby. The light guide 1110 extends upwardly, and the light guide plate 1070 is put in an intermediate portion thereof so that the light introduced from the LED 1120 into the light guide 1110 is further introduced into the light guide plate 1070. Moreover, an upper end portion of the light guide 1110 is bent toward the inside of the upper polarizer 1020. The lower side of the upper end portion of the light guide 1110 and the upper polarizer 1020 are fixed to each other through a double-faced adhesive tape 1112. The light guide 1110 can also be a cavity surrounded by a transparent plastic plate or the like, alternatively by an opaque plastic plate having a reflecting function.

Light from the LED 1120 is guided through the light guide 1110 to be introduced into the interior of the liquid guide plate 1070 and then outputted toward the polarized light splitter 1060 side. On the other hand, the light guide plate 1070 transmits the light from the liquid crystal cell 1010 side to the reflecting plate 1080.

The polarized light splitter 1060 has a structure similar to that shown in FIG. 1.

Particularly, in this embodiment, a pressure sensitive adhesive is placed on an upper surface of the reflecting plate 1080 which in turn, is adhered to the light guide plate 1070. In this adhering process, for easy manufacturing, the light guide plate 1070 is made so as not to have a large projection in its thickness direction. Accordingly, the light guide plate 1070 is made from a transparent plastic flat-plate having a thickness of approximately 0.7 mm.

When the liquid crystal cell 1010 is frame-rate-controlled, a bright full-color display is attainable not only when the external light is used and but also when the LED is in on condition.

Furthermore, if, in place of the lower glass substrate 1012, a plastic film as thin in thickness as below 0.12 mm is used, a bright full-color display with a high color purity is obtainable.

According to the fifteenth embodiment thus constructed, the color filters 1017 can provide a color display without positive-negative reversal not only under the external light but also under the lighting of the light source. Additionally, since the pressure sensitive adhesive 1050 containing light diffusing agent is interposed between the liquid crystal cell 1010 and the reflecting plate 1090, if the distance therebetween is prolonged, the double image or the bleeding (particularly, color bleeding) is reducible in the reflective display. Still additionally, since the effective utilization of light is feasible through the use of the polarized light splitter 1060, both the reflective and transmissive displays bright.

A sixteenth embodiment according to this invention relates to a light guide 72 suitable for use in the above-described display devices according to the first to fourteenth embodiments.

That is, the light guide 72 used in the display devices according to the first to fourteenth embodiments of this invention is made from a transparent plastic plate, such as polycarbonate or acrylic, and has a thickness of 0.3 to 2 mm, and further has irregularities on its surface. Preferably, the size thereof is in a range of approximately 10 to 200 μm and the pitch thereof is in a range of approximately 20 to 400 μm.

Figure 20:
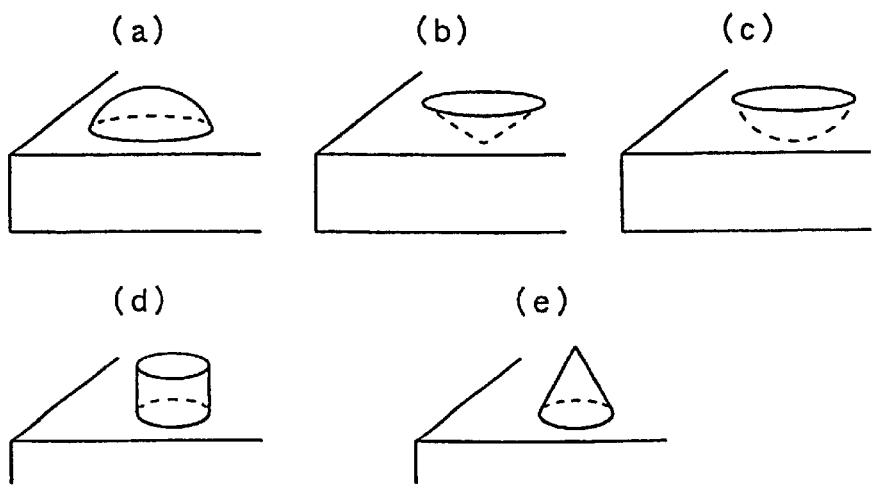
FIG. 20 is an illustration of a surface configuration of a display device according to sixteenth embodiment of this invention.

Furthermore, preferably, the configuration thereof is, for example, a generally hemispherical projection as shown in FIG. 20(a), a conical recess as shown in FIG. 20(b), a generally hemispherical recess as shown in FIG. 20(c), a cylindrical projection as shown in FIG. 20(d), a cylindrical recess as shown in FIG. 20(e), and other configurations are also acceptable. Additionally, it is also appropriate that the density distribution of the irregularities is changed in a plane so that the surface luminance of the light guider becomes uniform. Because of having irregularities on its surface, the light guide 72 also serves as a diffusion plate.

In addition, the light guide 72 is produced with the injection molding, and in order to lessen the optical anisotropy, undergoes heating or pressuring treatment.

A seventeenth embodiment relates to an electronic apparatus incorporating the monochrome or color liquid crystal display device according to each of the above-described embodiments.

That is, when the liquid crystal display device is used, for example, for a display section 172 of a portable telephone 171 shown in FIG. 21(a), it is possible to realize an energy-saving portable telephone providing a bright high-contrast reflective or transmissive display even in the daylight, in the shade or in room.

Furthermore, if it is used for a display section 174 of a wristwatch 173 shown in FIG. 21(b), it is possible to realize an energy-saving wristwatch providing a bright high-contrast reflective or transmissive display even in the daylight, in the shade or in room.

Still furthermore, if it is employed for a display screen 176 attached to a mainframe 177 of a personal computer (or an information terminal) 172 shown in FIG. 21(c), it is possible to realize an energy-saving personal computer providing a bright high-contrast reflective or transmissive display even in the daylight, in the shade or in room.

Figure 21:
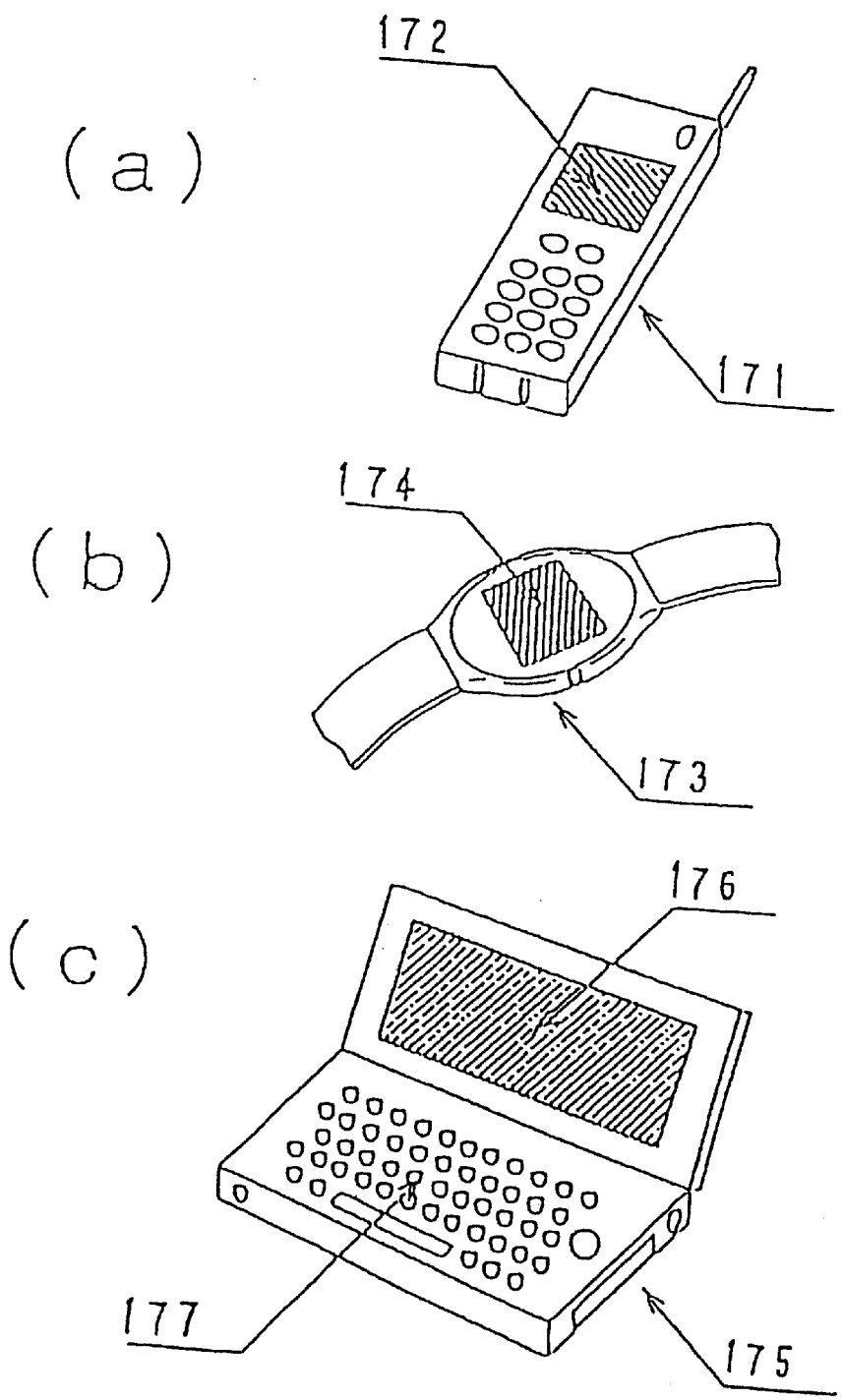
FIG. 21 is a schematic perspective view showing various types of electronic apparatus according to a seventeenth embodiment of this invention.
Figure 22:
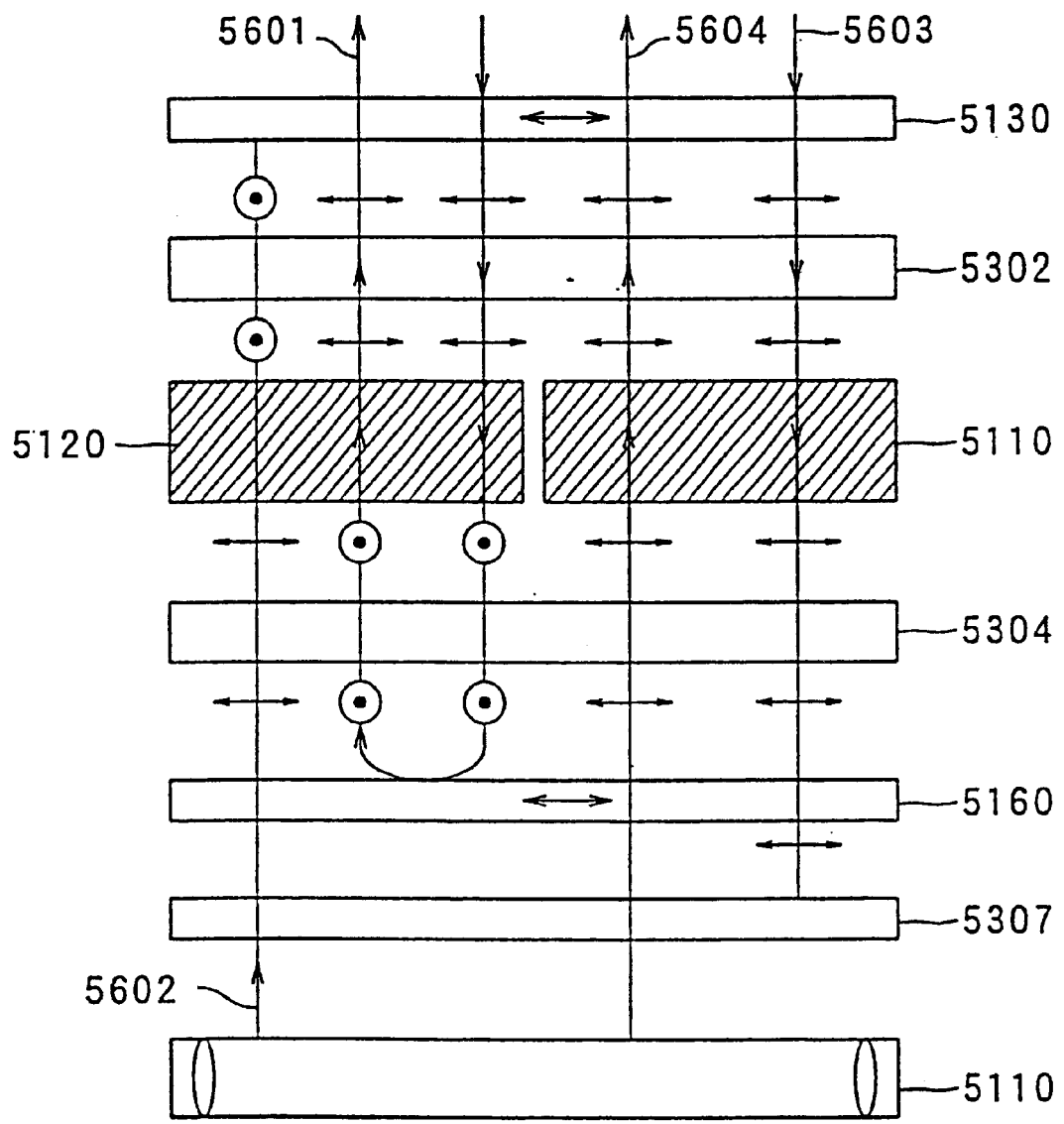
FIG. 22 is a schematic cross-sectional view for explaining a conventional display device.

In addition to the electronic apparatus shown in FIG. 21, the liquid crystal display devices according to the embodiments are also applicable to electronic apparatuses, such as a liquid crystal television, a viewfinder or monitor direct-viewing video tape recorder, a car navigation apparatus, an electronic pocketbook, a desk computer, a word processor, an engineering work station (EWS), a television telephone, a POS terminal and an apparatus equipped with a touch panel.

The display devices, the electronic apparatus and the light guider according to this invention are not limited to the above-described embodiments, but it should be understood that they are intended to cover all changes of the embodiments of the invention herein used for the purpose of the disclosure, which do not constitute departures from the point and spirit of the invention readable from the claims and the entire description, and the technical scope of this invention also includes a display device, an electronic apparatus and a light guider involving the changes.

What is claimed is:

1. A display device comprising:
   a first polarized light splitting plate;
   a second polarized light splitting plate;
   a liquid crystal panel positioned between the first and second polarized light splitting plates;
   a reflecting layer positioned on the same side of said liquid crystal panel as said second polarized light splitting plate, said second polarized light splitting plate being positioned between said liquid crystal panel and said reflecting layer;
   a light guider positioned between said second polarized light splitting plate and said reflecting layer;
   a third polarized light splitting plate positioned between said second polarized light splitting plate and said light guider, said third polarized light splitting plate transmitting or reflecting light in accordance with a polarization component of the light; and
   a forward scattering plate positioned between said second polarized light splitting plate and said third polarized light splitting plate such that light incident upon said liquid crystal panel passes through said forward scattering plate while coming to and returning from said reflecting layer.

2. The display device of claim 1, wherein:
   said second polarized light splitting plate transmits a polarized light polarized in a first direction, and
   said third polarized light splitting plate transmits a polarized light polarized in said first direction, and reflects a polarized light polarized in a second direction, said second direction being different from said first direction.

3. The display device of claim 2, wherein said second polarized light splitting plate absorbs a polarized light polarized in a third direction, said third direction being different from said first direction.

4. The display device of claim 1, wherein said second polarized light splitting plate absorbs a polarized light polarized in a direction which is different from a direction that said third polarized light splitting plate transmits.

5. The display device according to claim 1, wherein said forward scattering plate is positioned between said liquid crystal panel and said light guider.

6. The display device according to claim 1, wherein an optical anisotropy in said light guider minimally influences display chrominance non-uniformity in said display device.

7. The display device according to claim 1, wherein said light guider includes substantially constant optical axes directions.

8. The display device according to claim 1, wherein said third polarized light splitting plate includes adjacent layers, refractive indexes of the said adjacent layers being substantially equal in a predetermined direction while being different from each other in another direction that is perpendicular to said predetermined direction.

9. The display device according to claim 1, wherein said liquid crystal display panel comprises at least one of a TN liquid crystal element, a STN liquid crystal element, and an ECB liquid crystal element.

10. The display device according to claim 1, further comprising coloring means positioned between said first polarized light splitting plate and said light guider.

11. The display device according to claim 10, wherein said coloring means include a plurality of colors.

12. An electronic apparatus incorporating said display device according to claim 1.

13. A display device comprising:
   a liquid crystal panel;
   a polarizer positioned on one side of said liquid crystal display, said polarizer having a polarization axis for transmitting a polarized light;
   a reflector positioned on the same side of said liquid crystal panel as said polarized light splitting plate so that said polarizer is located between said liquid crystal panel and said reflector;
   a light guider positioned between said polarized light splitting plate and said reflector;

a polarized light splitting plate positioned between said light guider and said polarizer, said polarized, light splitting plate having a polarization axis for transmitting polarized light, the polarization axes of said polarizer and said polarized light splitting plate forming an angle between 0° and 40°; and a forward scattering plate positioned between said polarizer and said polarized light splitting plate such that light incident upon said liquid crystal panel passes through said forward scattering plate while coming to and returning from said reflector.

14. The display device according to claim 13, wherein said forward scattering plate is positioned between said liquid crystal panel and said light guider.

15. The display device according to claim 13, wherein said polarized light splitting plate includes adjacent layers, refractive indexes of the adjacent layers being substantially equal in a predetermined direction while being different from each other in another direction that is perpendicular to said predetermined direction.

16. The display device according to claim 13, wherein said liquid crystal display panel comprises at least one of a TN liquid crystal element, a STN liquid crystal element, and an ECB liquid crystal element.

17. The display device according to claim 13, further comprising coloring means including a plurality of colors.

18. An electronic apparatus incorporating said display device according to claim 13.

19. A display device comprising:

a first polarized light splitting plate;

a second polarized light splitting plate;

a liquid crystal panel positioned between the first and second polarized light splitting plates;

a reflecting layer positioned on the same side of said liquid crystal panel as said second polarized light splitting plate, said second polarized light splitting plate being positioned between said liquid crystal panel and said reflecting layer;

a light guider positioned between said second polarized light splitting plate and said reflecting layer;

a third polarized light splitting plate positioned between said second polarized light splitting plate and said light guider, said third polarized light splitting plate transmitting or reflecting light in accordance with a polarization component of the light; and a forward scattering plate positioned between said second polarized light splitting plate and said third polarized light splitting plate for scattering forwardly both light from said reflecting layer side toward said liquid crystal panel side and light from said liquid crystal panel side toward said reflecting layer side.

* * * * *